United States Patent
Fukushima et al.

[11] Patent Number: 5,997,700
[45] Date of Patent: Dec. 7, 1999

[54] METHOD OF FABRICATING MAGNETIC HEAD SLIDER

[75] Inventors: Nobuto Fukushima, Sayama; Yasuhiro Horiike, Houya, both of Japan

[73] Assignee: Citizen Watch Co., Ltd., Tokyo, Japan

[21] Appl. No.: 08/849,530

[22] PCT Filed: Dec. 15, 1995

[86] PCT No.: PCT/JP95/02583

§ 371 Date: Jun. 20, 1997

§ 102(e) Date: Jun. 20, 1997

[87] PCT Pub. No.: WO96/19800

PCT Pub. Date: Jun. 27, 1996

[30] Foreign Application Priority Data

Dec. 20, 1994 [JP] Japan .................................. 6-316130
Jan. 9, 1995 [JP] Japan .................................. 7-001220
Apr. 5, 1995 [JP] Japan .................................. 7-079989

[51] Int. Cl.[6] .......................... C23C 14/00; B44C 1/22
[52] U.S. Cl. .................. 204/192.35; 204/192.32; 216/22; 216/77
[58] Field of Search .................... 216/67, 41, 77, 216/79, 22; 204/298.16, 298.34, 298.37, 298.38, 192.32, 192.35; 324/112

[56] References Cited

U.S. PATENT DOCUMENTS

| 3,811,856 | 5/1974 | Ruszczyk et al. |
| 5,445,710 | 8/1995 | Hori et al. .................. 156/643.1 |
| 5,607,599 | 3/1997 | Ichihara et al. ................. 216/22 |

FOREIGN PATENT DOCUMENTS

| 56-74862 | 6/1981 | Japan . |
| 61-120326 | 6/1986 | Japan . |
| 61-123141 | 6/1986 | Japan . |
| 4-56785 | 2/1992 | Japan . |
| 4-129014 | 4/1992 | Japan . |
| 4-132011 | 5/1992 | Japan . |
| 5-6876 | 1/1993 | Japan . |
| 5-136100 | 6/1993 | Japan . |
| 6-236860 | 8/1994 | Japan . |
| 60-205879 | 10/1995 | Japan . |

OTHER PUBLICATIONS

The Institute of Electrical Engineers of Japan—DPS 1995—Proceedings of Symposium on Dry Process—Nov. 1–3, 1995.

Electron–Ion Beam Handbook—2nd. Edition.

*Primary Examiner*—Ponnathapura Achutamurthy
*Assistant Examiner*—P Ponnalun
*Attorney, Agent, or Firm*—Armstrong, Westerman, Hattori, McLeland & Naughton

[57] ABSTRACT

A mask (2) having a predetermined pattern formed on a work surface of amagnetic head slider substrate (1) containing aluminum oxide and titanium carbide as main constituents. The magnetic head slider substrate (1) with the mask (2) formed thereon as set on an electrode disposed inside an etching apparatus. While a reactive gas an insert gas are introduced into an excitation chamber (14) of the etching apparatus to cause plasma excitation of said gases to occur, a radio frequency power is applied to the electrode. Hereupon, reactive gas ions (4) and inert gas ions (5) that are generated by the plasma excitation are drawn to the magnetic head slider substrate (1), causing reactive etching by the reactive gas ions (4) and sputter-etching by the inert gas ions (5) to proceed concurrently.

3 Claims, 16 Drawing Sheets

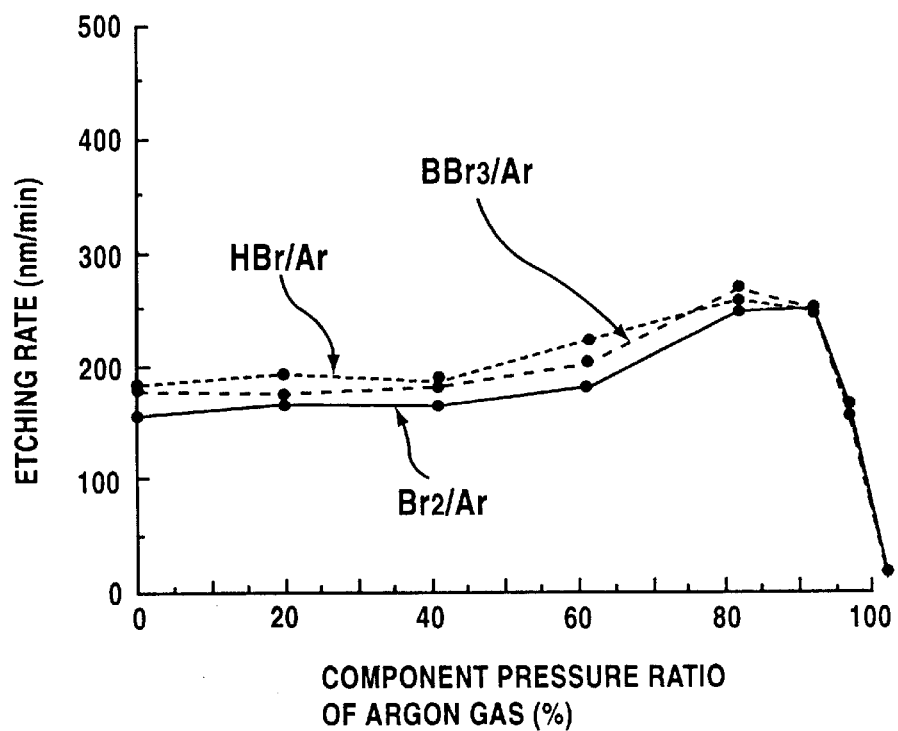
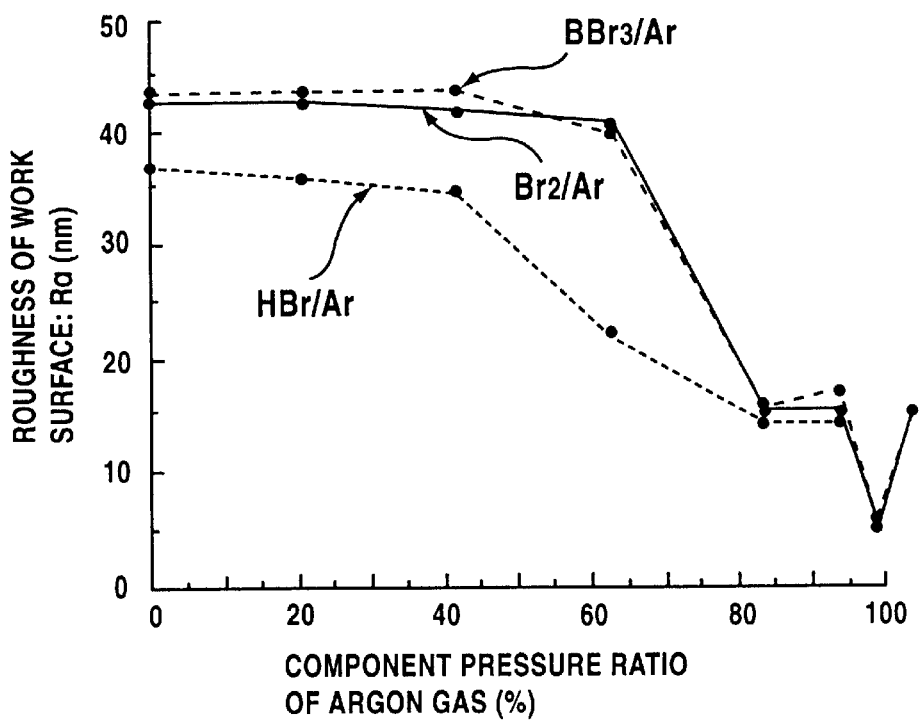

1

METHOD OF FABRICATING MAGNETIC HEAD SLIDER

BACKGROUND OF THE INVENTION

1. Field of the Invention

The present invention relates to a method of fabricating a magnetic head slider for use in recording information in a magnetic disk, tape, and the like and playing back the information, and particularly to a method of working on an air bearing surface of a thin film magnetic head slider, which is a component of a magnetic head.

2. Description of the Related Art

A flying magnetic head for use in, for example, a hard disk drive is provided with a magnetic head transducer and a magnetic head slider (hereinafter sometimes referred to merely as "slider"). The slider is a component that flies by the agency of air pressure caused by the magnetic disk rotation so as to keep the magnetic head transducer distanced from the magnetic disk and is provided with grooves (air bearing grooves) on a back surface (air bearing surface) thereof for controlling the air pressure.

As a result of a recording density of the magnetic disk becoming higher in recent years, it is now required that a flying height of the magnetic head from the magnetic disk be reduced. A negative pressure cavity slider as disclosed in U.S. Pat. No. 3,811,856 etc. represents an art meeting such requirement.

The negative pressure cavity slider is structured such that the air pressure occurring on the air bearing surface thereof is precisely controlled by the calculated effect of specifically-shaped grooves formed on the air bearing surface. As a result, variation in the flying height of the magnetic head caused by variation in a linear velocity and skew angle of the magnetic disk is minimal, thereby enabling variation in spacing loss between the magnetic head and the magnetic disk to be minimized.

It was difficult to fabricate the negative pressure cavity slider by mechanical working with the use of a grinder and the like since the air bearing grooves thereof are formed in a complex shape of a curve combined with a plurality of straight lines, unlike conventional linear-shaped grooves called slider rails.

Thereupon, a method of working on the negative pressure cavity slider has been proposed whereby the air bearing grooves are formed thereon with the use of the so called sputter-etching method. In this method, the air bearing grooves are etched on a slider substrate utilizing the effect of sputtering by argon plasma.

For example, an ion beam etching process and ion milling process with the use of a thin film or a photo resist as a mask were disclosed in Japanese Patent Laid-open Publication Nos. 56-74862 and 60-205879. Also, another ion beam etching process with the use of a dry film resist as a mask was disclosed in Japanese Patent Laid-open Publication No. 61-120326. These processes all belong to the sputter-etching method since in an ion beam etching apparatus and ion milling apparatus employed, respectively, in carrying out said processes, the slider substrate is etched by means of ion bombardment by argon ions evolved when plasma excitation of argon gas is caused to occur.

However, there have been pointed out a few problems with such methods as described above relying on the sputter-etching by argon plasma.

A first problem is so called "redeposition" wherein compounds sputtered out of the slider substrate by the ion bombardment are deposited back on the slider substrate again. The "redeposition" has been described in "Electron-Ion Beam Handbook, second edition", p. 487, published by Nikkan Kogyo Shimbun, and also in a number of technical publications.

A typical example of the redeposition is described hereinafter with reference to FIGS. 23A and 23B. Along with progress in the etching process by argon ions 25, molecules and atoms sputtered out of a slider substrate 1 build up mainly on a wall face 26 of a mask 2 such as a resist and the like, and a wall face 27 of each of the air bearing grooves 29 formed by the etching process, thus forming a redeposition layer 28.

Meanwhile, as the etching process by the argon ions 25 proceeds substantially in parallel with formation of the aforesaid redeposition layer 28, the removal of the redeposition layer 28 through the etching process hardly occurs (FIG. 23A). Consequently, when the mask 2 is removed upon completion of the etching process, parts of the redeposition layer 28 remain as "burrs" 28a, protruding from the air bearing surface 11 (FIG. 23B).

In the negative pressure cavity slider of which the flying height of 0.1 $\mu$m or less is recently required the, presence of the burrs 28a as described above prevent air pressure distribution over the air bearing surface 11 from conforming to a design calculation, resulting in instability of the flying height of the magnetic head. This has caused an output of the magnetic head to fluctuate, thereby causing errors in recording and reading. Furthermore, there was even a risk of the burrs 28a damaging the magnetic disk surface, and causing such a critical failure as erasure of data recorded in the magnetic disk.

Accordingly, the conventional practice was to remove the burrs 28a by lapping the air bearing surface 11 of the slider substrate 1 using a grinder and the like after completion of the etching process. Such an additional step of processing, however, results in an increase in the production cost and a decrease in the yield because satisfactory jig positioning accuracy was not obtainable when changing over from jigs for etching to same for mechanical grinding.

During the conventional etching process, a practice of controlling generation of burrs 28a by use of the so called oblique working has also been employed, thereby rotating the slider substrate 1 at a predetermined tilt angle to the direction in which the argon ions 25 are coming in. It is an attempt to remove by etching the redeposition layer 28 building up on the wall face 26 of the mask 2 and the wall face 27 of the air bearing groove 29 by injecting the argon ions 25 obliquely.

However, when the argon ions are injected so as to strike obliquely and evenly against the wall faces 26 and 27 that are oriented in various directions by rotating the slider substrate 1, edge portions in the air bearing groove 29 are temporarily shaded from the ion bombardment depending on the tilt angle of rotation. As illustrated in FIG. 24, each of the edge portions 29a temporarily shaded makes a slope because a processing rate in this region becomes less than that for another bottom surface region 29b of the air pressure groove 29.

In designing the negative pressure cavity slider, the air pressure distribution is calculated on the assumption that the edge portions 29a of the air bearing groove 29 are properly worked. Accordingly, the aforesaid slope of each of the edge portions 29a leads to errors in the air pressure distribution, making it difficult to provide the magnetic head with the flying characteristic as expected.

A second problem as pointed out is a rate of processing by the sputter-etching method, that is, a low etching rate. Very fine composite ceramic material containing aluminum oxide (hereinafter sometimes referred to as "alumina") and titanium carbide as main constituents has lately come into wider use for making the slider substrate. The time required for processing such a composite ceramic material as described above through the etching process utilizing the effect of sputtering by argon ions becomes considerably lengthened.

In the case of processing the composite ceramic material described above by use of the ion milling process belonging to the sputter-etching method, a depthwise etching rate is normally in the order of 20 to 30 nm/min. Consequently, it took many hours to complete the negative pressure cavity slider provided with the air bearing grooves (usual depth: 5~20 $\mu$m).

This has resulted in not only considerably lower productivity but also intense depletion of the etching apparatus due to continuous operation for many hours, necessitating frequent replacement of electrodes, filaments, and the like, thereby complicating maintenance work.

A third problem, as pointed out, is roughness of a work surface after etching. Specifically, in the composite ceramic material made mainly of aluminum oxide and titanium carbide, crystal grains of respective constituents are present in a state independent from each other. It is known that when the sputter-etching method is applied to the composite ceramic material described above, aluminum oxide grains are preferentially removed by etching. As a result, only titanium carbide grains remain on an etched surface, causing the work surface to become rough. Furthermore, as the titanium carbide grains were often in a state about to be broken away from the work surface, they posed a risk of damaging the magnetic disk surface when they were in fact broken away in the course of the magnetic head being driven in operation. In addition, there was a strong likelihood that fine debris would find their way into ragged parts of the etched surface, creating a cause for concern with unstable flying characteristic of the magnetic head.

As described in the foregoing, with the conventional method of working on the magnetic head slider with the use of sputter-etching method utilizing argon plasma, there have been pointed out such problems as protruding burrs remaining on the air bearing surface, lower productivity due to longer processing time required, the need for complicated maintenance work, and rough etched surfaces.

It is, therefore, an object of the invention to provide a method of fabricating a magnetic head slider having high reliability as well as stable flying characteristic in a short time, solving the problems as described above.

SUMMARY OF THE INVENTION

The aforesaid object of the invention is attained by a first method of the invention, stated hereafter, whereby a magnetic head slider provided with air bearing grooves is fabricated.

Specifically, a mask having a predetermined pattern is formed on a work surface of the magnetic head slider substrate made of mainly aluminum oxide and titanium carbide. After setting the magnetic head slider substrate with the mask formed thereon on top of an electrode disposed inside an etching apparatus, a reactive gas and an inert gas are introduced into an excitation chamber of the etching apparatus, causing plasma excitation of the gases while a radio frequency power is applied to the aforesaid electrode. Hereupon, reactive gas ions and inert gas ions that are generated by the plasma excitation are drawn to a magnetic head slider substrate, thereby effecting reactive etching by the reactive gas ions and sputter-etching by the inert gas ions concurrently.

A gas selected from the group consisting of, for example, chlorine-based gas such as chlorine gas, carbon tetrachloride gas, boron trichloride gas, a mixture of chlorine gas and boron trichloride gas, and the like, and bromine-based gas such as bromine gas, hydrogen bromide gas, boron tribromide gas, and the like, may be used as reactive gas in carrying out the invention.

Further, the etching apparatus required in carrying out the invention has a construction comprising a vacuum chamber, for example, the inside of which can serve as a plasma excitation chamber, an exhaust port communicated with an exhaust pump for evacuating air out of and sucking gases into the vacuum chamber, an electrode serving as a substrate holder on which the magnetic head slider substrate is disposed and to which a bias voltage is applied, a gas inlet port through which the reactive gas and the inert gas can be supplied separately at respective optional component pressures, and a plasma excitation means for causing plasma excitation of the gases.

FIG. 1 is a schematic representation of the excitation chamber 14 and the structure around the periphery of the magnetic head slider substrate 1, inside the etching apparatus using the reactive gas ions, employed in carrying out the invention.

At least one of gases capable of generating reactive ions and at least one of inert gases of the 0 group elements that have been introduced into the etching apparatus are excited, respectively, in the excitation chamber 14 by the action of radio frequency waves or microwaves, causing plasma 3 to occur. In FIG. 1, the aforesaid gases are subjected to inductively coupled excitation by radio frequency power supplied from a radio frequency power supply 7 provided with a matching circuit 8. Symbol Zp in the figure denotes the plasma impedance.

Meanwhile, high frequency power supplied from a bias power supply 9 is applied to the magnetic head slider substrate 1 via the electrode not shown in FIG. 1. Between the bias power supply 9 and the electrode (not shown), a blocking capacitor 10 is interposed. Accordingly, the magnetic head slider substrate 1 is in a state in which a negative d-c voltage component (that is, bias voltage) is applied thereto by the operation of the blocking condenser 10 and the effect of difference in transfer speed between ions and electrons contained in the plasma 3.

The negative d-c voltage component causes the reactive gas ions 4 and the inert gas ions 5, generated in the plasma 3, to be drawn to the magnetic head slider substrate 1, effecting the etching process.

Hereupon, the reactive gas ions 4 produce compounds mainly having sublimation characteristic, or easily vaporizable compounds, causing these compounds to vaporize. This means that the reactive gas ions 4 are involved in the so called reactive etching. On the other hand, the inert gas ions 5 are involved in sputter-etching by the ion bombardment.

Consequently, reactive products generated on the magnetic head slider substrate 1 are rapidly removed due to the effect of sputter-etching by the inert gas ions 5, thereby accelerating the etching process.

Further, the inert gas ions 5 contribute to removal of various polymers generated through decomposition of the reactive gas, a impurities spluttered from the wall faces of equipment and the like etching regions, accelerating reaction between the reactive gas ions 4 and the magnetic head slider substrate 1.

As a result of such operations as described above, an etching rate (that is, a processing speed) of the magnetic head slider substrate 1 is enhanced. Furthermore, because of the effect of isotropic etching by the reactive gas ions 4, formation of the redeposition layer causing generation of burrs is controlled.

Because titanium carbide is preferentially etched during the reactive etching process while aluminum oxide is preferentially etched during the sputter-etching process, it is possible to perform etching of both aluminum oxide and titanium carbide, making up the magnetic head slider substrate 1, substantially at an even rate by balancing one process with the other, enabling formation of a smooth etched surface. In this instance, balancing of one etching operation with the other is easily attained by adjusting a ratio of a component pressure of the inert gas to same of the reactive gas.

In a second method of the invention, as described hereafter, the air bearing grooves are formed on the magnetic head slider.

A mask having a predetermined pattern is formed on a work surface of the magnetic head slider substrate made of mainly aluminum oxide and titanium carbide. After setting the magnetic head slider substrate with the mask formed thereon on top of the electrode disposed inside the etching apparatus, a reactive gas is introduced into the excitation chamber of the etching apparatus, causing plasma excitation of the gas while a radio frequency power is applied to the aforesaid electrode. Hereupon, the reactive gas ions generated by the plasma excitation are drawn to the magnetic head slider substrate, causing the reactive etching by the reactive gas ions to proceed.

In the second method of the invention, a reactive gas selected from the group consisting of chlorine gas, a mixture of chlorine gas and carbon tetrachloride gas, a mixture of chlorine gas and boron trichloride gas, boron trichloride gas, bromine gas, hydrogen bromide gas, and boron tribromide gas can be used as reactive gas.

The second method according to the invention is described in greater detail hereafter with reference to FIG. 2.

After introducing any of the reactive gases described above into the excitation chamber of the reactive etching apparatus, plasma excitation of the gas is caused to occur by applying thereto radio frequency (RF) power, and the like. Chemical reaction by radicals or etching ions 13 generated through the plasma excitation causes a magnetic head slider substrate 11 made of the composite ceramic material containing alumina and titanium carbide as main constituents to be etched.

Atoms 14 to be removed by etching, that is, aluminum atoms, titanium atoms, and the like that are contained in the magnetic head slider 11, are turned into volatile substances through reaction with the etching ions 13, enabling etching to proceed at a high rate. In case of the reactive gas containing carbon tetrachloride, the etching rate is further accelerated through reduction of alumina by the carbon tetrachloride.

Further, in case of a gas mixture of chlorine gas and carbon tetrachloride gas being used as the reactive gas, noticeable effects of the operations as described above were observed when a component pressure ratio of the carbon tetrachloride gas to the total pressure of the gas mixture inside the excitation chamber of the etching apparatus was kept at 80% or less.

BRIEF DESCRIPTION OF DRAWINGS

FIG. 19 is a graph showing the measurement results of etching rates, carried out on the basis of an eighth embodiment of the invention.

FIG. 20 is a graph showing the measurement results of roughness of a etched surface carried out on the basis of the eighth embodiment of the invention.

DETAILED DESCRIPTION OF THE PREFERRED EMBODIMENTS

A method of fabricating a magnetic head slider according to the invention is described in detail hereafter on the basis of preferred embodiments as practiced by the inventor and examples used for description by comparison.

Figure 1:
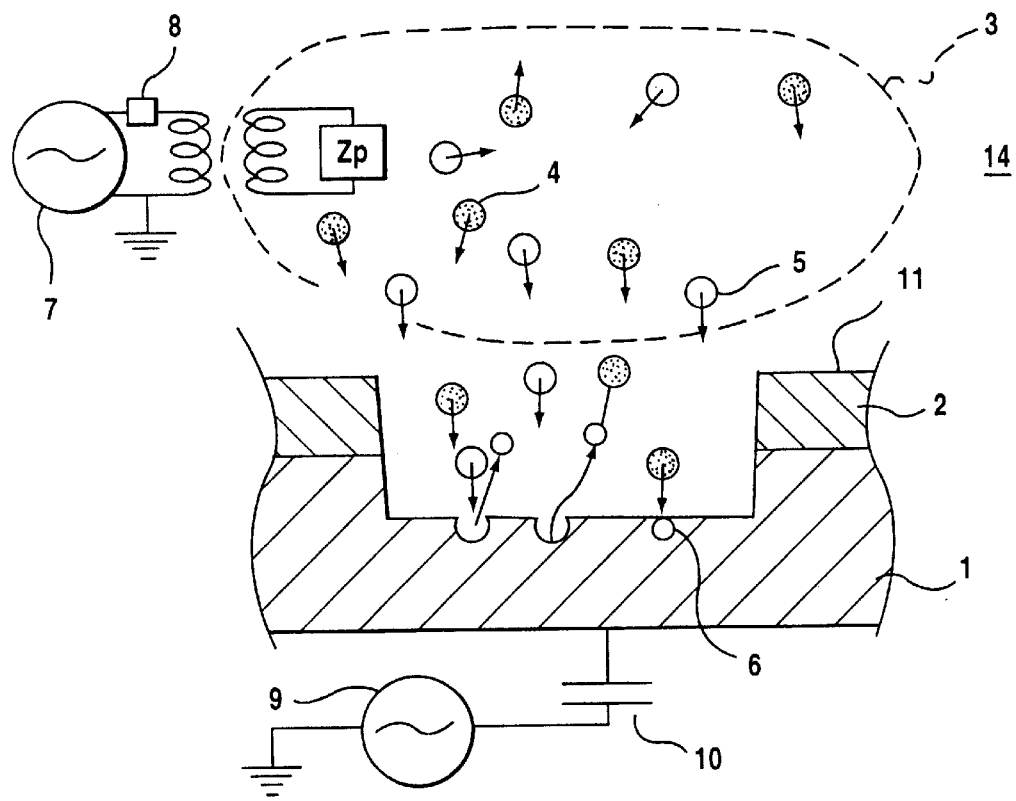
FIG. 1 is a schematic representation for illustrating the operation according to a first method of the invention.

As shown in FIG. 1, showing a first embodiment of the present invention a mask 2 is formed on a work surface (surface faced to a magnetic disk) of a magnetic head slider substrate 1. In this embodiment, the mask 2 having a pattern corresponding to air bearing grooves is formed by applying a photolithographic process to a dry film photo resist of 75 $\mu$m thick.

Figure 3:
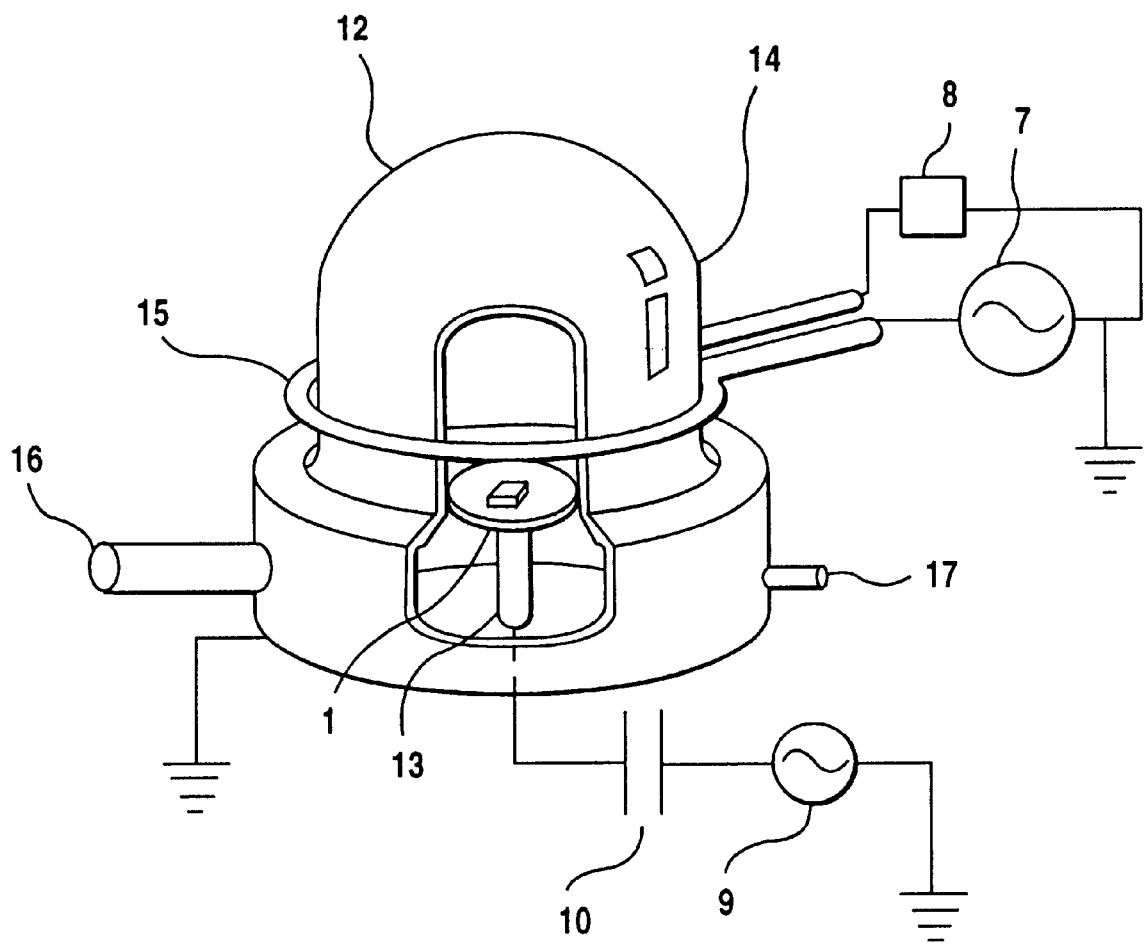
FIG. 3 is a schematic illustration showing an example of an etching apparatus used in carrying out embodiments of the invention.

In this instance, an inductively coupled plasma (ICP) etching apparatus of the construction as shown in FIG. 3 was employed. The plasma etching apparatus comprises a hemispheric bell jar made of quartz, constituting a main body 12 wherein an excitation chamber 14 is housed, and a single-turn antenna 15 disposed around the main body 12. FIG. 3 is a partial cutaway view of the main body 12, shown for illustrative convenience.

The plasma etching apparatus is provided further with an exhaust port 16 for communication with a turbo pump and a rotary pump, and a gas inlet port 17 through which various gases are brought in independently from each other.

An electrode 13 serving as a substrate holder concurrently is disposed inside the main body 12 in such a way as to be insulated from the surrounding thereof, and the magnetic head slider substrate 1 (with the mask 2 formed thereon) is fixed on top of the electrode 13. The electrode 13 is provided with a water cooling means (not shown in the figure) for taking out heat generated in the course of etching.

The magnetic head slider substrate 1 is made of an aluminum oxide—titanium carbide composite ceramic material, called "AC-2" (trade name of a product developed by Sumitomo Special Metals Co., Ltd.).

After fixing the magnetic head slider substrate 1 (with the mask 2 formed thereon) on top of the electrode 13, the excitation chamber 14 is evacuated down to a pressure at $10^{-5}$ Torr or less by activating the pumps communicated with the exhaust port 16.

Subsequently, reactive gases consisting of chlorine gas at about 0.8 m torre and boron trichloride gas at about 1.2 m Torr are introduced into the excitation chamber 14 via the gas inlet port 17. Further, an inert gas of argon gas at 8 m torr is introduced into the excitation chamber 14 via the gas inlet port 17. Thus, an aggregate pressure of all these gases stands at 10 m Torr.

Then, for plasma excitation of the gases introduced into the excitation chamber 14, high frequency power of 1.2 kW at 13.56 MHz was applied to the antenna 15 from a high frequency power supply 7 equipped with a matching circuit 8. Simultaneously, a radio frequency power of 500 V at 100 KHz from a bias power supply 9 was applied to the electrode 13 on top of which the magnetic head slider substrate 1 is fixed, starting an etching process for the magnetic head slider substrate 1. In this embodiment, the etching process was continued for 8 minutes.

Chlorine gas and boron trichloride gas generate chlorine ions involved in reactive etching while argon gas generates argon ions involved in sputter-etching, and all these ions are drawn to the work surface of the magnetic head slider substrate 1 by the radio frequency power applied to the electrode 13.

After completion of the etching process, the mask 2 was removed from the work surface of the magnetic head slider substrate 1, and a depth of each of etched regions was measured. The measurement results showed that the depth was 2.3 $\mu$m, indicating an etching rate at 290 nm/min. No burr was observed on the work surface of the magnetic head slider substrate 1.

In a second embodiment of the present invention, an etching process was applied to a work surface of the magnetic head slider substrate 1 by the same process and on the same conditions as in the case of the first embodiment, and using the same apparatus and materials as used in the first embodiment except that a gas introduced into the excitation chamber 14 was changed.

In this instance, a reactive gas selected from the group consisting of chlorine gas ($Cl_2$), boron trichloride gas ($BCl_3$), carbon tetrachloride gas ($CCl_4$), and a gas mixture (chlorine gas 40% and boron trichloride gas 60%) was used as reactive gas and introduced into the excitation chamber 14 together with inert argon gas (Ar). The aggregate pressure of the gases described above was adjusted to be 10 m Torr.

Figure 4:
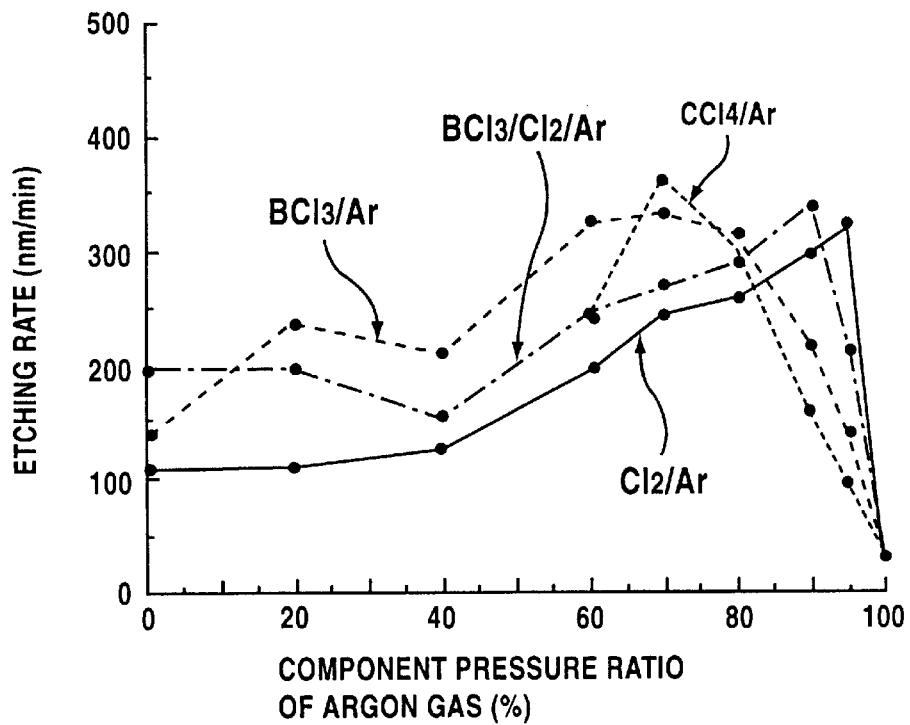
FIG. 4 is a graph showing the measurement results of etching rates, carried out on the basis of a second embodiment of the invention.

FIG. 4 is a graph showing relationships between component pressure ratios of argon gas and etching rates as measured in the second embodiment.

As is apparent from FIG. 4, for any combination of the gases the etching rate generally increases according to an increase in the component pressure ratio of argon gas, reaching the peak rate at the component pressure ratio of argon gas in the range from 70 to 95% and dropping sharply at the component pressure ratio thereof close to 100%.

Even without addition of argon gas, the etching rate in the range from 100 to 200 nm/min, nearly ten times higher than that for the conventional sputter-etching process, was attained. Further, with combination of carbon tetrachloride gas and argon gas, a maximum rate as high as 360 nm/min or higher was attained. It is presumed that high etching rates were achieved even in regions of low component pressure ratios of the reactive gas because plasma of intensely high density was generated through an inductively coupled plasma excitation method adopted in this embodiment.

Figure 5:
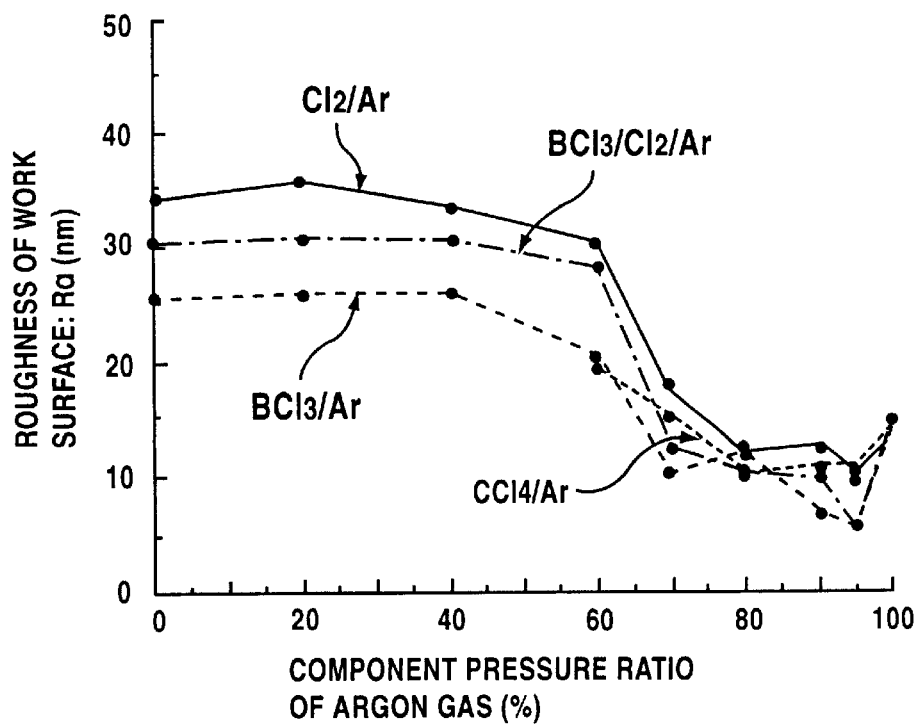
FIG. 5 is a graph showing the measurement results of roughness of a etched surface carried out on the basis of the second embodiment of the invention.

FIG. 5 is a graph showing relationships between component pressure ratios of argon gas and roughness of a work surface in the second embodiment.

As is apparent from FIG. 5, considerable improvement in the roughness of the work surface after etching was achieved by keeping the component pressure ratio of argon gas at 70% or higher although magnitude of improvement differed slightly depending on a type of the reactive gas used. Even in case of the component pressure ratio of argon gas being less than 70%, the roughness of the work surface was improved as compared with a case of the conventional process, enhancing the flying characteristic of the magnetic head slider.

The results as shown in FIGS. 4 and 5 suggest that it is preferable to keep the component pressure ratio of argon gas in the range from 70 to 95% in case that an emphasis is placed particularly on reliability of the performance of the magnetic head slider.

As for generation of burrs on the work surface, a few redeposition layers that appeared composed of carbon-bearing polymers were observed at the side of the resist mask immediately after completion of the etching process in the case of carbon tetrachloride gas being used as the reactive gas. However, the redeposition layers were easily removed during a process of removing the resist mask (hereinafter referred to as "mask removal process"), leaving nothing in the form of the burrs. In the case of other combination of gases being used, presence of the burrs was not observed.

In a third embodiment of the present invention, an etching process was applied to a work surface of the magnetic head slider substrate 1 by the same process and on the same conditions as in the case of the first embodiment, and using the same apparatus and materials as used in the first embodiment except for use of krypton gas as an inert gas introduced into the excitation chamber 14.

Figure 6:
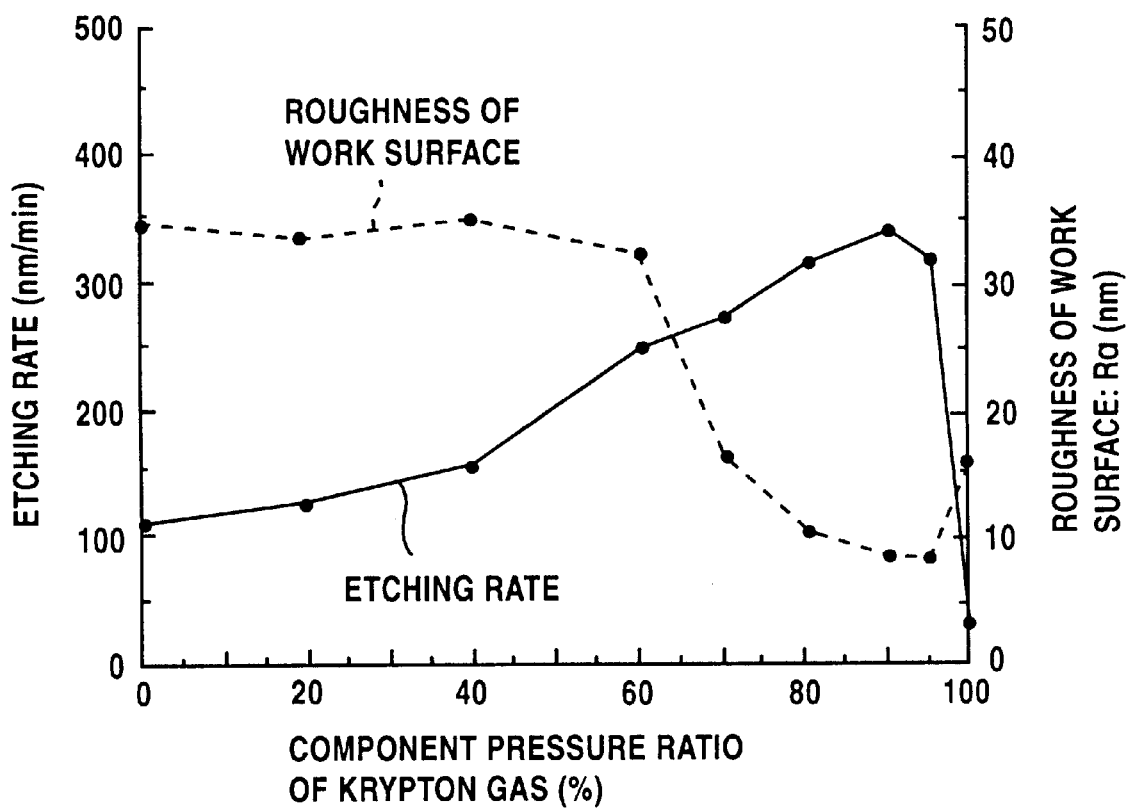
FIG. 6 is a graph showing the measurement results of etching rates, carried out on the basis of a third embodiment of the invention.

The results, as shown in FIG. 6, indicate a similar tendency to that of the second embodiment employing argon gas in respect of both etching rates and roughness of the work surface in relation to component pressure ratios of krypton gas. Further, no burr was observed on the work surface of the magnetic head slider substrate 1 after removal of the mask, proving that not only argon gas but also various other gases contributing to sputter-etching may be used in carrying out the method of the invention.

Figure 7:
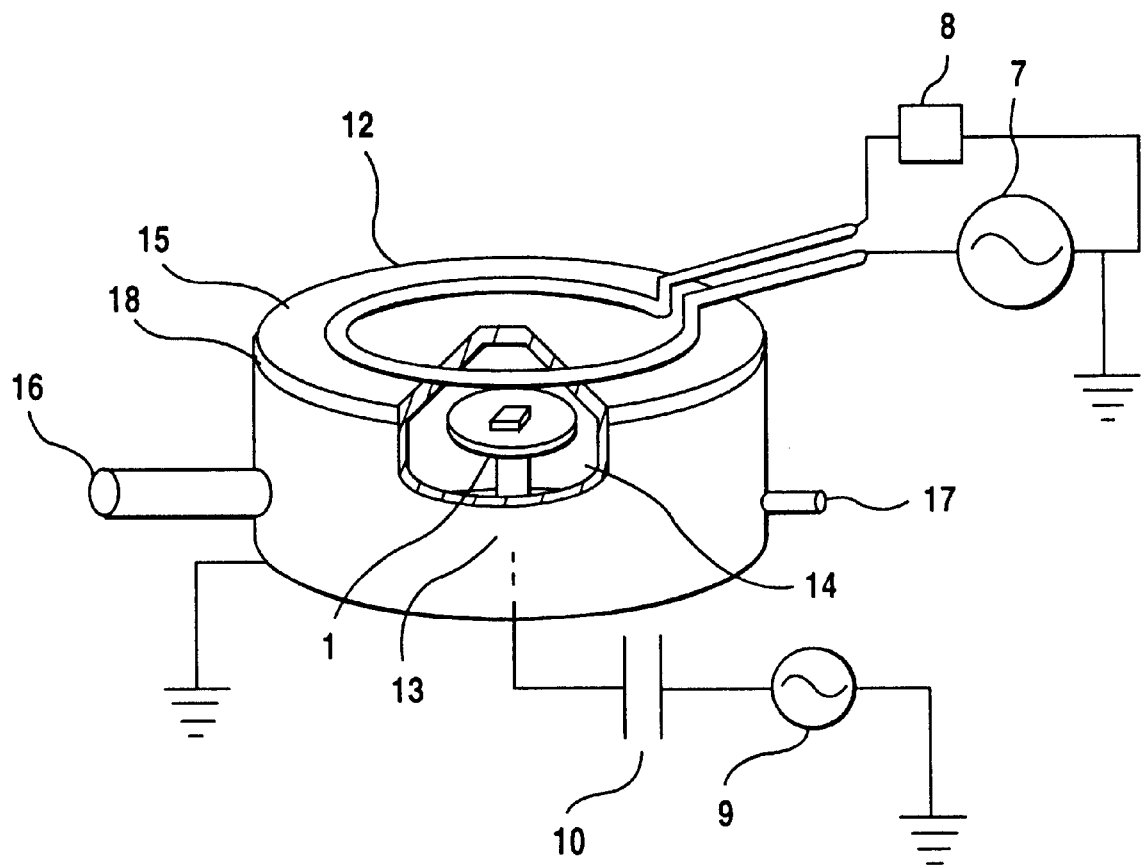
FIG. 7 is a schematic illustration showing another example of an etching apparatus used in carrying out embodiments of the invention.

In a fourth embodiment of the present invention, an etching process was applied to the magnetic head slider substrate using an inductively coupled plasma etching apparatus of a construction as shown in FIG. 7.

The plasma etching apparatus shown in FIG. 7 comprises an excitation chamber 14 provided with a ceiling composed of a quartz plate 18, and a single-turn antenna 15 disposed on top of the ceiling. Otherwise, the plasma etching apparatus has the construction similar to that as shown in FIG. 3, and accordingly, respective parts in FIG. 7, corresponding to same in FIG. 3, are denoted with same reference numerals as in FIG. 3, and detailed description thereof is omitted.

In this embodiment too, plasma excitation of a reactive gas and an inert gas that are introduced into the excitation chamber 14 of the plasma etching apparatus is caused to occur by operation of high frequency waves. Ions generated through the plasma excitation are drawn to the magnetic head slider substrate 1 by applying a bias voltage to an electrode 13, thereby causing reactive etching and sputter-etching to proceed concurrently.

The same materials and process as used in the aforementioned second embodiment were used in carrying out the fourth embodiment, and gases stated hereafter were introduced into the excitation chamber 14. A reactive gas selected from the group consisting of chlorine gas, boron trichloride gas, carbon tetrachloride gas, and a gas mixture (chlorine gas 40% and boron trichloride gas 60%) was used as reactive gas and introduced into the excitation chamber 14 together with argon gas (inert gas). The aggregate pressure of the gases described above was adjusted to be 10 m Torr.

Then, the etching process was continued for eight minutes by outputting high frequency power of 1.2 kW at 13.56 MHz to the antenna 15 disposed on top of the ceiling, and simultaneously applying a bias of 500V at 100 KHz to the electrode 13.

Figure 8:
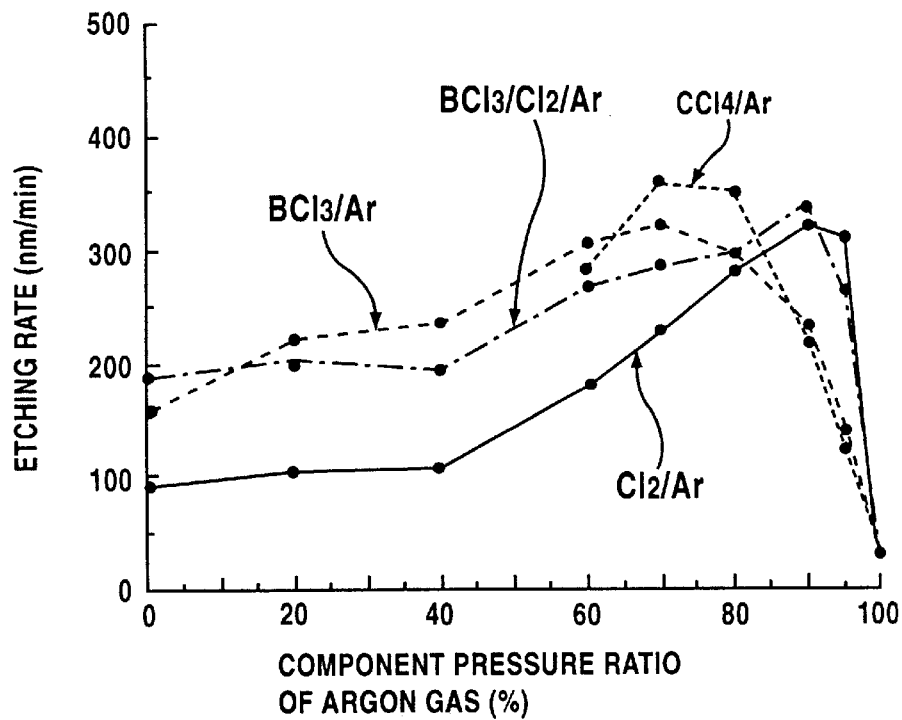
FIG. 8 is a graph showing the measurement results of etching rates, carried out on the basis of a fourth embodiment of the invention.
Figure 9:
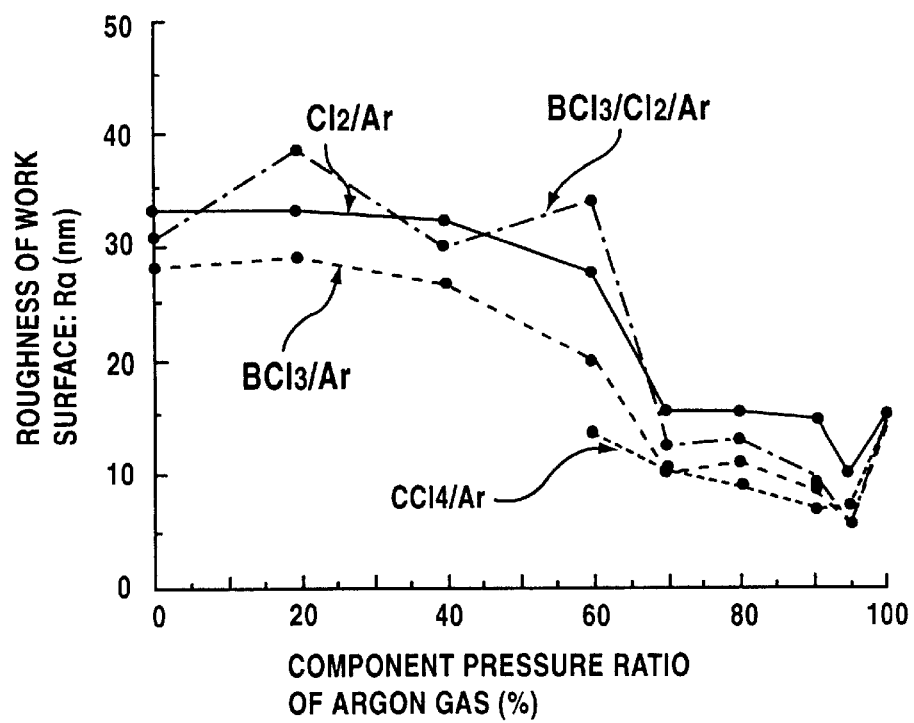
FIG. 9 is a graph showing the measurement results of roughness of a etched surface carried out on the basis of the fourth embodiment of the invention.

Results of processing as above were found similar to those of the second embodiment, as shown in FIGS. 8 and 9 in respect of etching rates and roughness of the work surface, respectively. Further, no burr was observed on the work surface of the magnetic head slider substrate 1 after removal of the mask.

Figure 10:
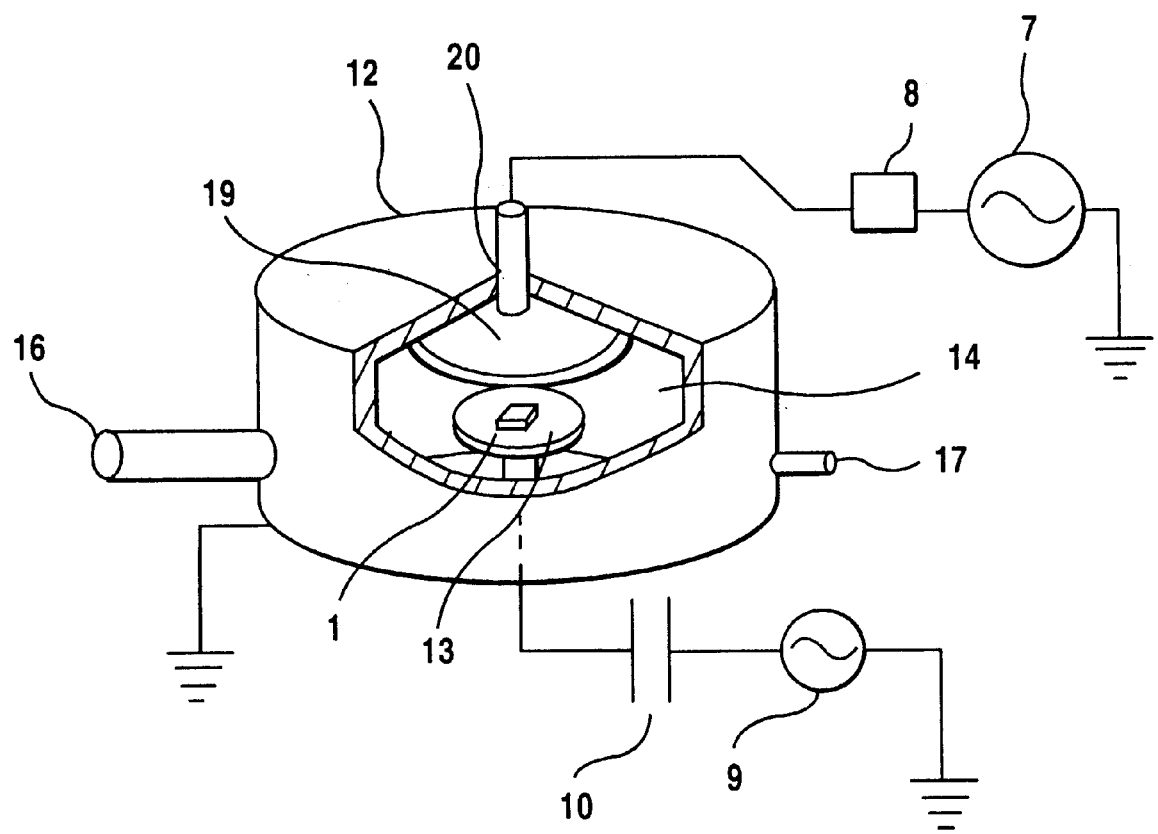
FIG. 10 is a schematic illustration showing a further example of an etching apparatus used in carrying out embodiments of the invention.

In fifth embodiment of the present invention, an etching process was applied to the magnetic head slider substrate using an etching apparatus with parallel plate-shaped electrodes of a construction as shown in FIG. 10. In the construction as shown in FIG. 10, parts same as or similar to those previously described with reference to FIG. 3 are denoted with the same reference numerals as used in FIG. 3.

The etching apparatus as shown in FIG. 10 is constructed such that plasma excitation of gases introduced into an excitation chamber 14 is caused to occur by an upper electrode 19 connected to a high frequency power supply 7. In this etching apparatus too, operation of high frequency waves causes plasma excitation of a reactive gas and an inert gas to occur, and ions generated by the plasma excitation are drawn to the magnetic head slider substrate 1 by a bias voltage applied to an electrode 13, thus enabling reactive etching and sputter-etching to proceed concurrently.

The same materials and process as used in the aforementioned second embodiment were used in carrying out the fifth embodiment, and gases stated hereafter were introduced into the excitation chamber 14. A gas selected from the group consisting of chlorine gas, boron trichloride gas, carbon tetrachloride gas, and a gas mixture (chlorine gas 40% and boron trichloride gas 60%) was used as reactive gas and introduced into the excitation chamber 14 together with argon gas (inert gas). The aggregate pressure of the gases described above was adjusted to be 10 m Torr.

Then, the etching process was continued for eight minutes by outputting high frequency power of 1.2 kW at 13.56 MHz to the upper electrode 19 and simultaneously applying a bias of 500V at 100 KHz to the electrode 13.

Figure 11:
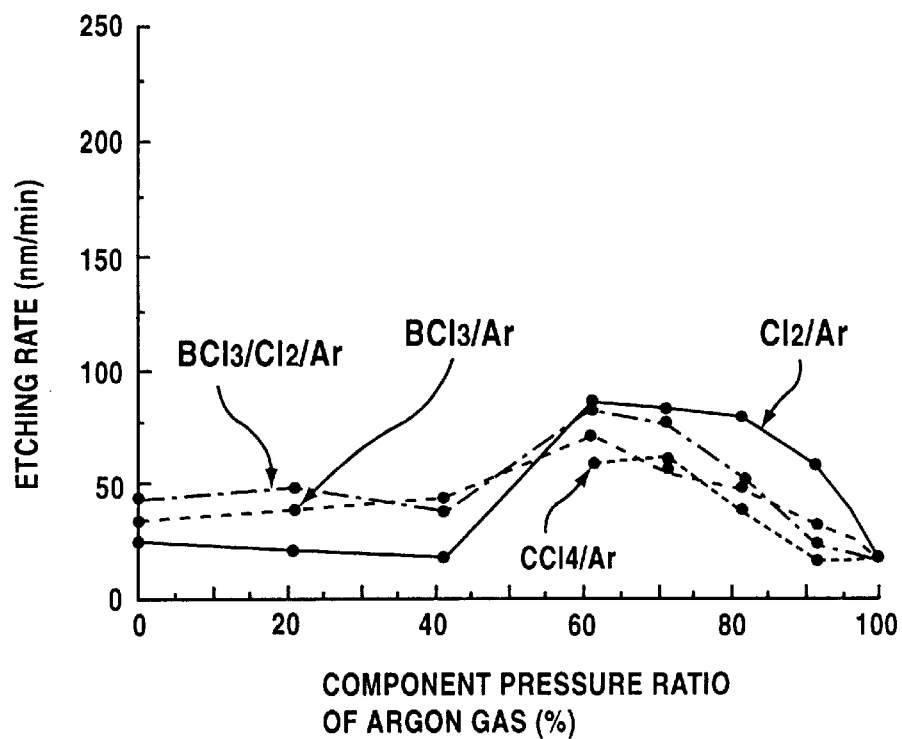
FIG. 11 is a graph showing the measurement results of etching rates, carried out on the basis of a fifth embodiment of the invention.
Figure 12:
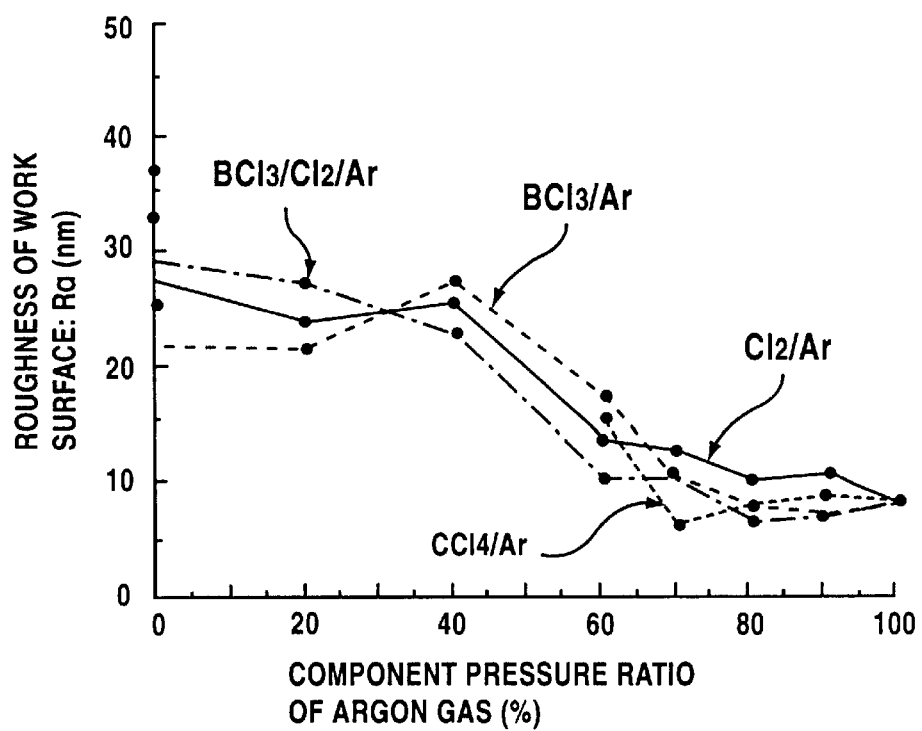
FIG. 12 is a graph showing the measurement results of roughness of a etched surface carried out on the basis of the fifth embodiment of the invention.

Results of processing as above were found similar to those of the second embodiment, as shown in FIGS. 11 and 12 in respect of etching rates and roughness of a work surface, respectively, except that the maximum etching rate, which was about 100 nm/min, was lower than that in the case of the second embodiment. Presumably, such a decrease in the etching rate as described above was caused by a differing density of plasma occurring in the excitation chamber of the etching apparatus used in this embodiment from same of the etching apparatus used for the second embodiment. Still the etching rate attained was four times greater than that for the conventional sputter-etching method. Furthermore, no burr was observed on the work surface of the magnetic head slider substrate 1 after removal of the mask.

[Sixth Embodiment]

Figure 13:
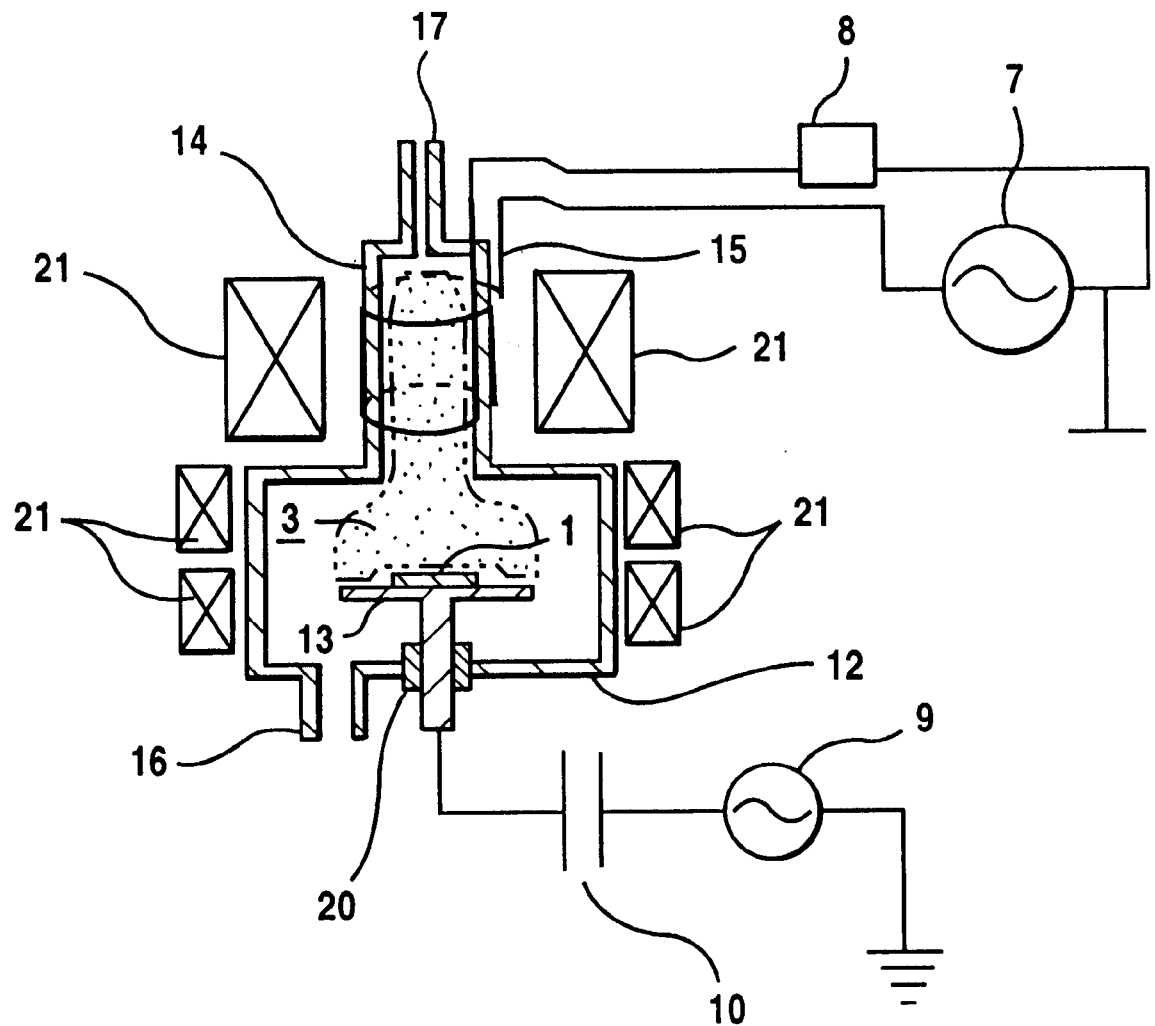
FIG. 13 is a schematic illustration showing a still further example of an etching apparatus used in carrying out embodiments of the invention.

In a sixth embodiment of the present invention, an etching process was applied to the magnetic head slider substrate using a helicon wave plazma etching apparatus of a construction as shown in FIG. 13. In the construction as shown in FIG. 13, parts same as or similar to those previously described with reference to FIG. 3 are denoted with same reference numerals as in FIG. 3.

A plasma of m=0 mode is caused to occur through plasma excitation of a reactive gas and an inert gas that are introduced into an excitation chamber 14 from a gas inlet port 17 by outputting high frequency power at 13.56 MHz from a high frequency power supply 7 to an antenna 15 disposed around the periphery of the excitation chamber 14. The plasma 3, after a density thereof is enhanced by the agency of solenoids coil 21 disposed around a main body 12, is transferred to the vicinity of the magnetic head slider substrate 1.

Then, ions generated by the plasma excitation are drawn to the magnetic head slider substrate 1 by a bias voltage applied to the electrode 13, thus enabling reactive etching and sputter-etching to proceed concurrently.

The same materials and process as used in the aforesaid second embodiment were used in carrying out the sixth embodiment, and gases stated hereafter were introduced into the excitation chamber 14. A gas selected from the group consisting of chlorine gas, boron trichloride gas, carbon tetrachloride gas, and a gas mixture (chlorine gas 40% and boron trichloride gas 60%) was used as reactive gas and introduced into the excitation chamber 14 together with argon gas (inert gas). The aggregate pressure of the gases described above was adjusted to be 10 m Torr.

A high frequency power of 1.2 kW at 13.56 MHz was outputted to the antenna 15 provided in the upper part of the etching apparatus while a bias of 500V at 100 kHz was applied to the electrode 13, continuing the etching process for eight minutes.

Figure 14:
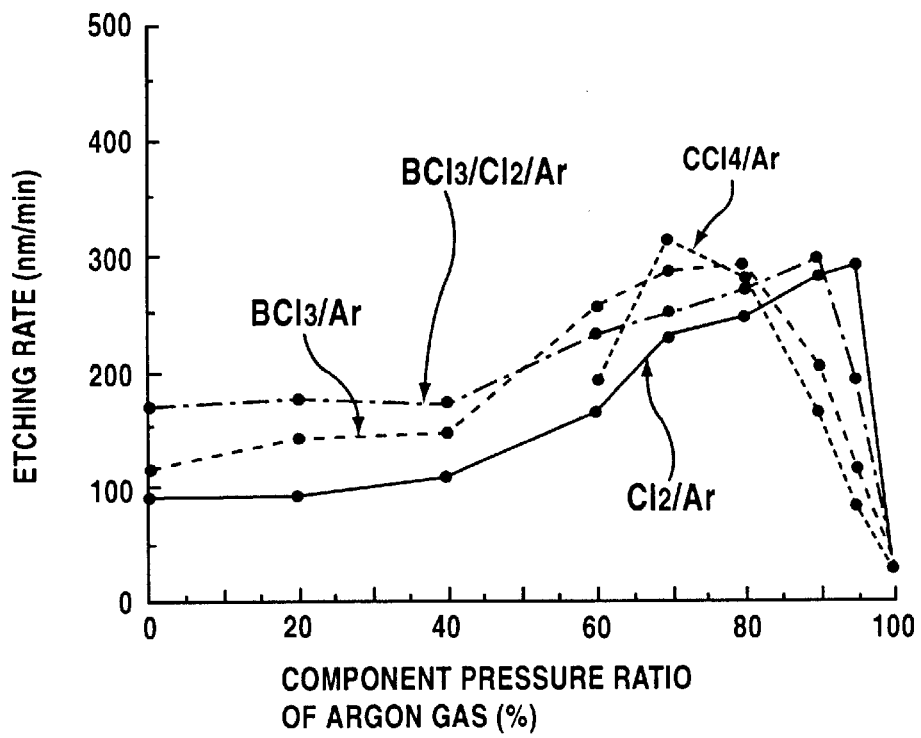
FIG. 14 is a graph showing the measurement results of etching rates, carried out on the basis of a sixth embodiment of the invention.
Figure 15:
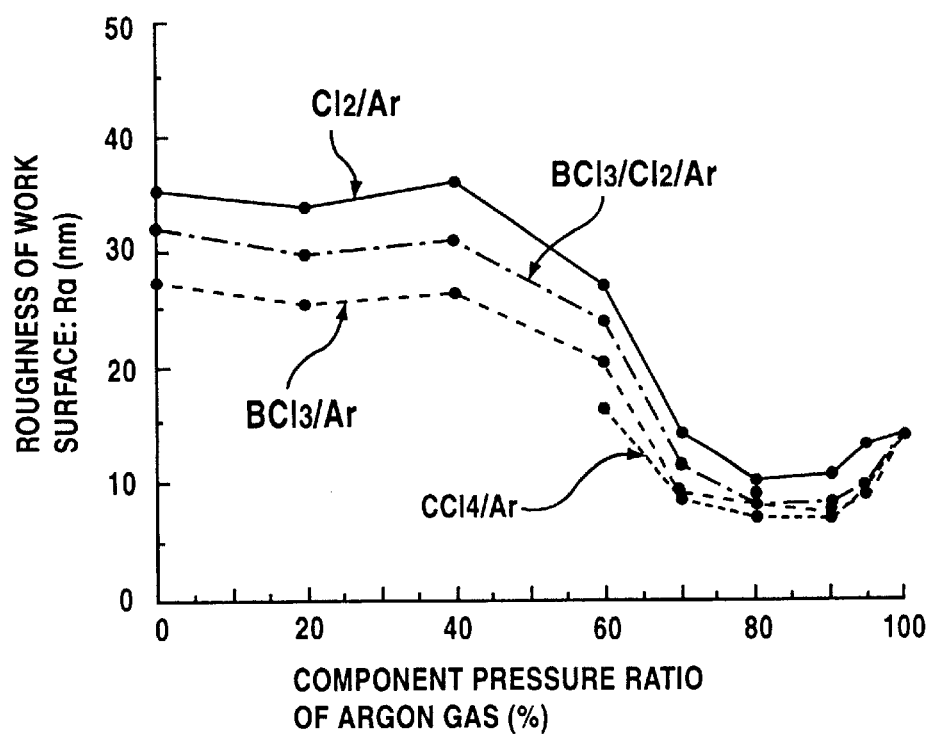
FIG. 15 is a graph showing the measurement results of roughness of a etched surface carried out on the basis of the sixth embodiment of the invention.

Results of processing as above were found similar to those of the second embodiment, as shown in FIGS. 14 and 15 in respect of etching rates and roughness of a work surface, respectively. Furthermore, no burr was observed on the work surface of the magnetic head slider substrate 1 after removal of the mask.

Figure 16:
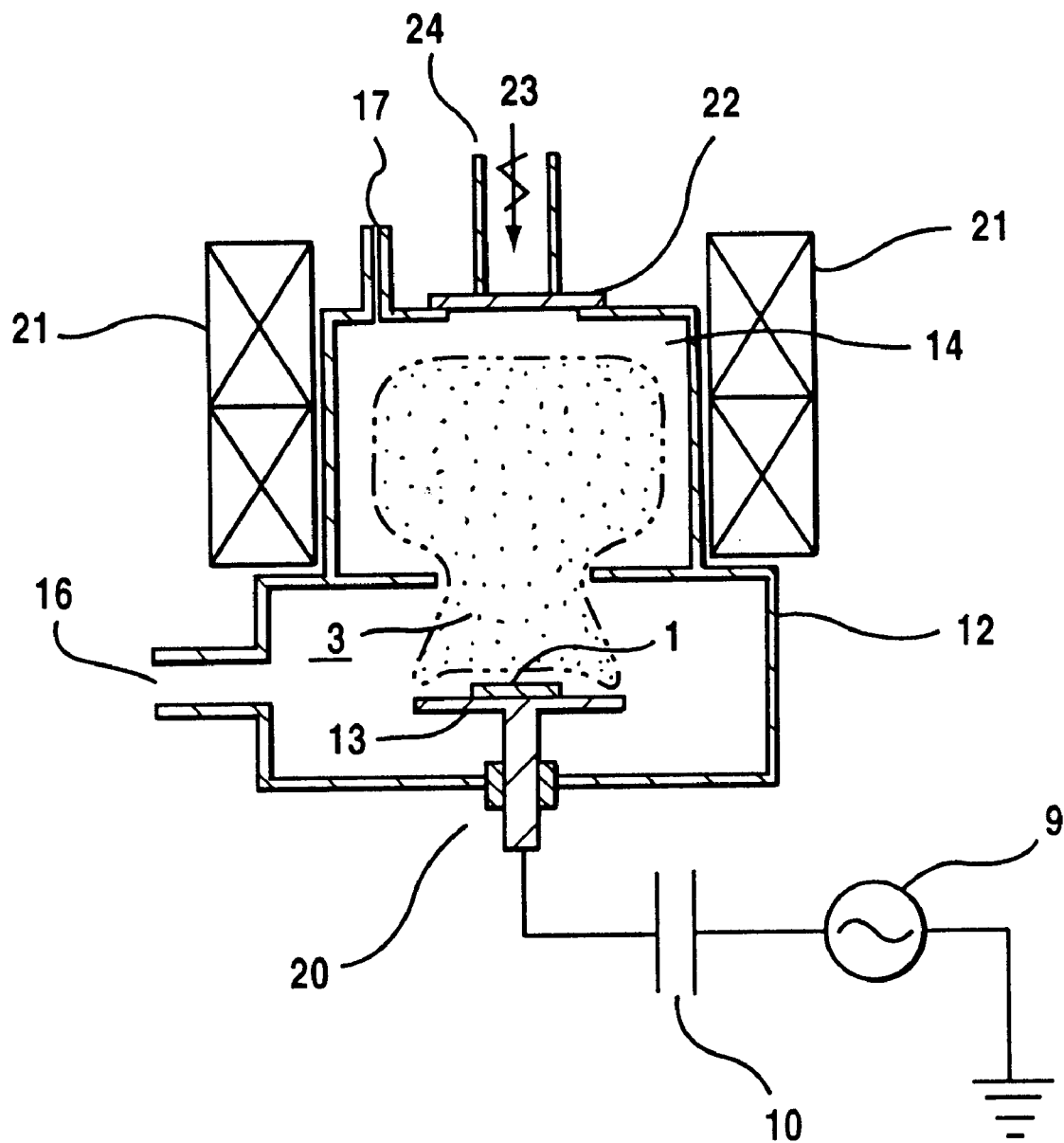
FIG. 16 is a schematic illustration showing a different example of an etching apparatus used in carrying out embodiments of the invention.

In a seventh embodiment of the present invention, an etching process was applied to the magnetic head slider substrate using an electron cyclotron resonance (ECR) plasma etching apparatus of a construction as shown in FIG. 16. In the construction as shown in FIG. 16, parts same as or similar to those previously described with reference to FIGS. 3 and 13 are denoted with the same reference numerals as used in FIGS. 3 and 13.

Microwaves 23 at 2.45 GHz outputted via an alumina plate 22 disposed on top of an excitation chamber 14 resonate with a magnetic field in a plane of magnetic flux density at 87.5 mT produced by solenoid coils 21, causing plasma excitation of a reactive gas and an inert gas that are brought in from a gas inlet port 17 to occur.

Then, ions generated through the plasma excitation are drawn to the magnetic head slider substrate 1 by a bias voltage applied to an electrode 13, enabling reactive etching and sputter-etching to proceed concurrently.

The same materials and process as used in the aforesaid second embodiment were used in carrying out the seventh embodiment, and gases stated hereafter were introduced into the excitation chamber 14. A gas selected from the group consisting of chlorine gas, boron trichloride gas, carbon tetrachloride gas, and a gas mixture (chlorine gas 40% and boron trichloride gas 60%) was used as reactive gas and introduced into the excitation chamber 14 together with argon gas (inert gas). The aggregate pressure of the gases described above was adjusted to be 10 m torr.

The microwaves 23 of 600W were transmitted through a waveguide 24 while a bias of 500V at 100 kHz was applied to the electrode 13, continuing the etching process for eight minutes.

Figure 17:
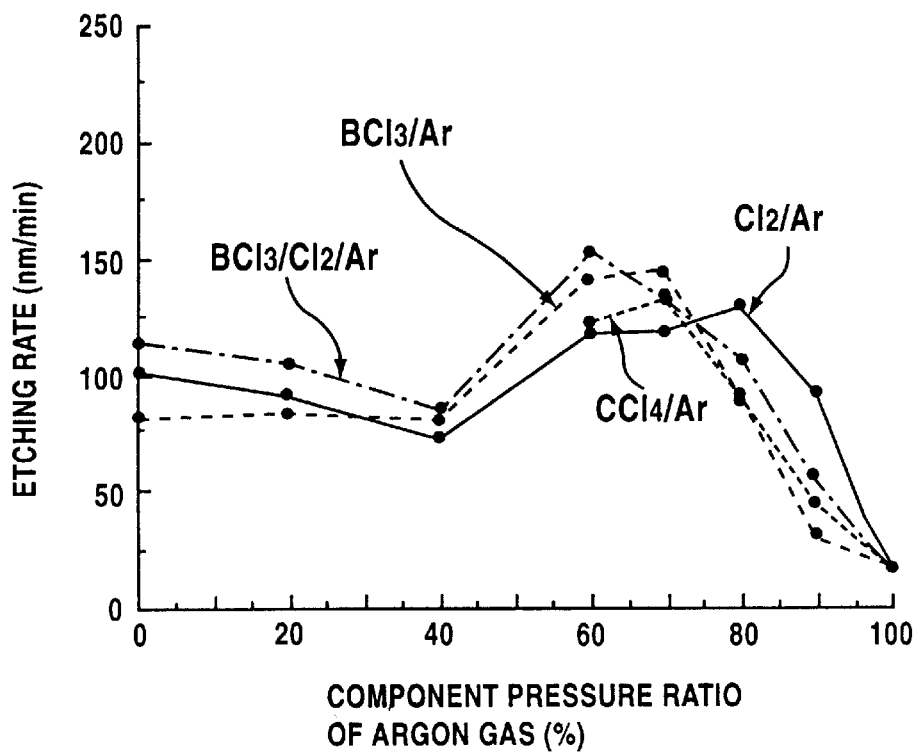
FIG. 17 is a graph showing the measurement results of the etching rates, carried out on the basis of a seventh embodiment of the invention.
Figure 18:
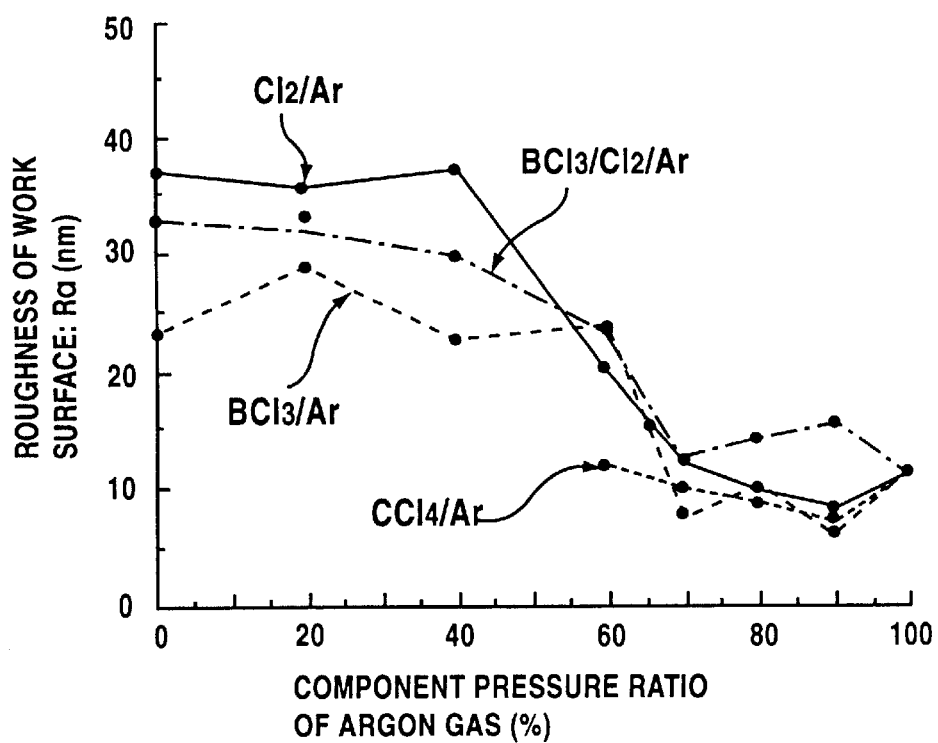
FIG. 18 is a graph showing the measurement results of roughness of a etched surface carried out on the basis of the seventh embodiment of the invention.

Results of processing as above were found similar to those of the second embodiment, as shown in FIGS. 17 and 18 in respect of etching rates and roughness of a work surface, respectively. Furthermore, no burr was observed on the work surface of the magnetic head slider substrate 1 after removal of the mask.

In the first through the seventh embodiments, the first method of the invention was carried out using chlorine gas (reactive gas). As is apparent from these embodiments, it is possible to fabricate the magnetic head slider substrate in a short time and with high precision by means of the first method of the invention with the use of various types of etching apparatuses constructed such that plasma excitation of gases introduced therein is caused to occur through an appropriate means, and simultaneously ions in the plasma are drawn to a magnetic head slider substrate (workpiece) by applying a bias voltage.

Frequencies of radio frequency waves and microwaves employed to cause plasma excitation or in biasing may not be limited to the values as set in carrying out the respective embodiments described above and are adjustable as necessary.

COMPARATIVE EXAMPLE 1

A sputter-etching process using argon gas according to the conventional method was applied to a magnetic head slider substrate, by way of an example for proving the effect of the first method of the invention, carried out with the use of chlorine gas (reactive gas).

Tests were carried out using the same apparatus, materials, and process and on the same operating conditions as in the case of the respective embodiments described in the foregoing, except for gases used, and the sputter-etching process was applied by introducing only argon gas into an excitation chamber. These examples correspond to the cases of the component pressure ratio of argon gas being 100% in the respective embodiments described above using argon gas as inert gas.

Specifically, with reference to FIGS. 4, 5, 8, 9, 11, 12, 14, 15, 17, and 18, the results of measurement with the component pressure ratio of argon gas at 100% represent the results of processing by the conventional sputter-etching process.

According to the aforesaid results, etching rates achieved in respective comparative examples are lower than that for corresponding embodiments of the invention. Further, roughness of a work surface after etching in the comparative examples are not substantial in magnitude, but titanium carbide grains were observed raised on parts of the work surface, posing a likelihood of the raised grains being broken away and damaging the magnetic disk. Furthermore, redeposition layers having the same chemical composition as that of the magnetic head slider substrate were found built up on the work surface of the magnetic head slider substrate and left intact even after the resist removal process and a cleaning process, eventually remaining as burrs.

[Eighth Embodiment]

In an eighth embodiment of the invention, the first method of the invention, as described in the foregoing, was carried out with the use of bromine gas (reactive gas).

This embodiment was carried out using the inductively coupled plasma etching apparatus as used in the first embodiment (see FIG. 3), adopting the same process, materials, and operating condition as used in the first embodiment.

In this embodiment, a gas selected from the group consisting of bromine gas ($Br_2$), boron tribromide gas ($BBr_3$), and hydrogen bromide gas (HBr), was used as reactive gas and introduced into an excitation chamber 14 together with argon gas (Ar) as inert gas. The aggregate pressure of the gases described above was adjusted to be 10 m Torr.

Plasma excitation of the reactive gas and inert gas that were introduced into the excitation chamber 14 was caused to occur by operation of high frequency waves. Ions generated through the plasma excitation are drawn to the magnetic head slider substrate 1 by applying a bias voltage to an electrode 13, thereby causing reactive etching and sputter-etching to proceed concurrently.

FIG. 19 is a graph showing relationships between component pressure ratios of argon gas and etching rates as measured in the eighth embodiment.

As is apparent from FIG. 19, the etching rate increases in any combination of gases generally according to an increase in the component pressure ratio of argon gas, reaching the peak rate of 200 nm/min or higher at the component pressure ratio of argon gas in the range from 70 to 95%. Then, the etching rate sharply drops as the component pressure ratio of argon gas approaches 100%.

Even without addition of argon gas (that is, at 0% of the component pressure ratio of argon gas), the etching rate is in the range from 160 to 190 nm/min, confirming that it is by far greater than that for the conventional sputter-etching process. This case corresponds to a case of carrying out a second method of the invention using bromine gas.

FIG. 20 shows relationships between component pressure ratios of argon gas and roughness of a work surface as measured in the eighth embodiment As is apparent from FIG. 20, considerable improvement in the roughness of the work surface after etching was achieved by keeping the component pressure ratio of argon gas at 70% or higher although magnitude of improvement differed slightly depending on a type of the reactive gas used. Even in case of the component pressure ratio of argon gas being less than 70%, the roughness of the work surface was shown improved as compared with a case of the conventional process, thus enhancing the flying characteristic of the magnetic head slider.

The results as shown in FIGS. 19 and 20 suggest that it is preferable to keep the component pressure ratio of argon gas in the range from 70 to 95% in case that an emphasis is placed particularly on reliability of the performance of the magnetic head slider.

No burr was observed on the work surface of the magnetic head slider substrate 1 after removal of the mask.

COMPARATIVE EXAMPLE 2

The etching process according to the conventional sputter-etching method with the use of argon gas was applied to the magnetic head slider substrate, by way of an example for proving the effect of the first method of the invention, carried out with the use of bromine-based gas (reactive gas).

Tests were carried out by adopting the same apparatus, materials, process, and operating conditions as used in the eighth embodiment, except for gases used, and the sputter-etching process was applied by introducing argon gas into the excitation chamber.

Test results show that an etching rate was 30 nm/min, equivalent to less than one twentieth of the maximum etching rate achieved in a ninth embodiment of the invention. Furthermore, redeposition layers having the same chemical composition as that of the magnetic head slider substrate were found built up on the work surface of the magnetic head slider substrate and left intact even after the resist removal process and a cleaning process, eventually remaining as burrs. The reason for such results as above is presumably that nothing but sputter-etching by argon gas ion bombardment can take place in this case even if plasma excitation of argon gas is caused to occur because argon gas is an inert gas.

In a ninth embodiment through an eleventh embodiment of the present invention, an etching process was applied to the magnetic head slider substrate on the basis of the aforesaid second method of the invention.

The ninth embodiment was carried out using the inductively coupled plasma etching apparatus as used in the first embodiment (see FIG. 3), adopting the same process, materials, and operating condition as used in the first embodiment. In this embodiment, chlorine gas as reactive gas was introduced into an excitation chamber 14 from a gas inlet port 17, and plasma excitation of the chlorine gas was caused to occur.

Hereupon, chlorine ions involved in reactive etching were generated by the chlorine gas, and drawn to the work surface of the magnetic head slider substrate 1 by a radio frequency power applied to an electrode 13. The etching process was continued for eight minutes.

After completion of the etching process, a mask was removed from a work surface of the magnetic head slider substrate, and a depth of etched regions was measured. The depth thereof was found to be 0.9 $\mu$m, indicating that an etching rate was 113 nm/min.

Figure 2:
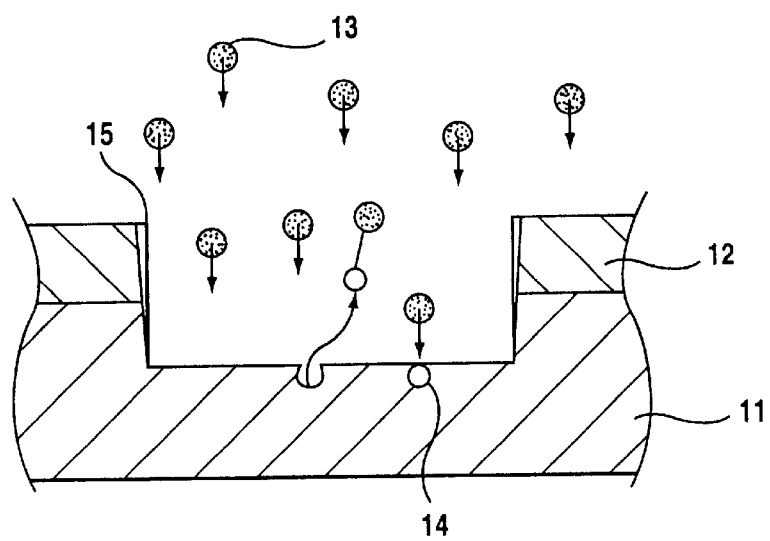
FIG. 2 is a schematic representation for illustrating the operation according to a second method of the invention.

Further, after completion of the etching process, redeposition layers 15 were observed at the side faces of the mask 12 as shown in schematic form in FIG. 2. However, results of analyzing the redeposition layers 15 showed that same were composed mainly of chlorides. Accordingly, the redeposition layers 15 were easily removed in the mask removal process, without leaving burrs.

[Tenth Embodiment]

In a tenth embodiment, an etching process was applied to a work surface of the magnetic head slider substrate 1 adopting the same process and operating conditions with the use of the same apparatus, and the same materials as in the ninth embodiment except that a gas introduced into an excitation chamber 14 was changed.

In carrying out the tenth embodiment, a gas mixture of chlorine gas and carbon tetrachloride gas was used as reactive gas, and introduced into the excitation chamber 14. By varying a component pressure ratio of carbon tetrachloride gas in the range from 0 to 100% against an aggregate pressure of the gas mixture, measurement was made to establish relationships between component pressure ratios and etching rates.

Figure 22:
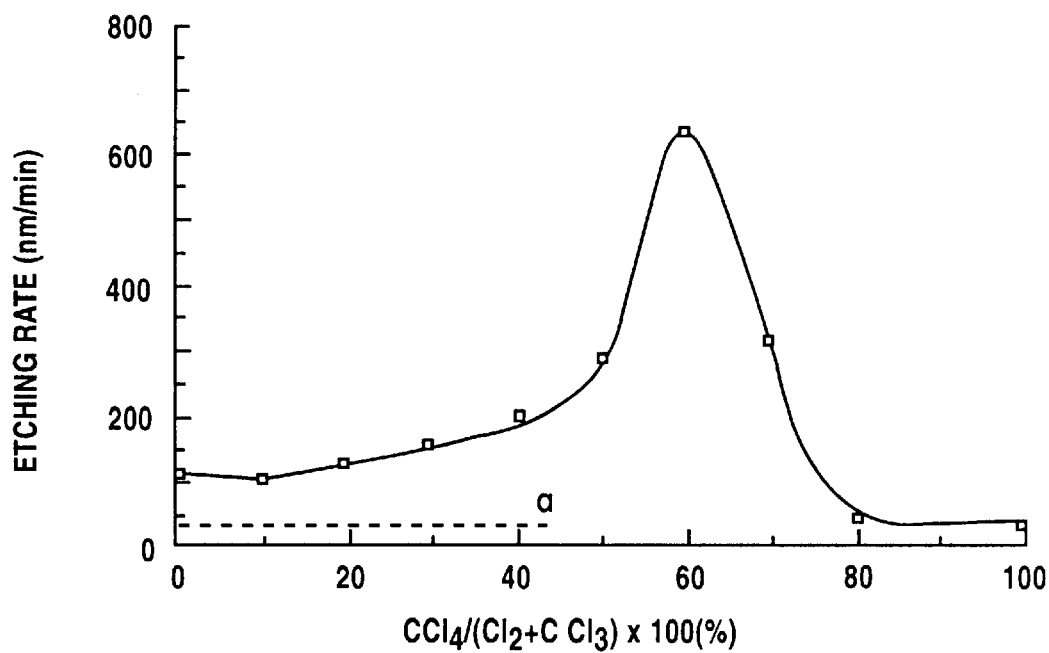
FIG. 22 is a graph showing the measurement results of etching rates, carried out on the basis of a tenth embodiment of the invention.
Figure 23A:
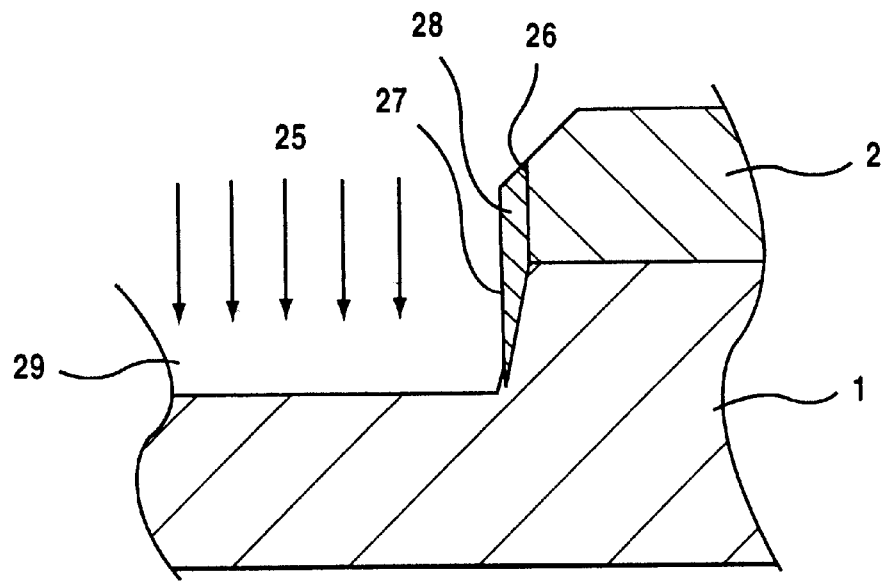
FIG. 23A is a conceptual view for illustrating a conventional method of etching.
Figure 23B:
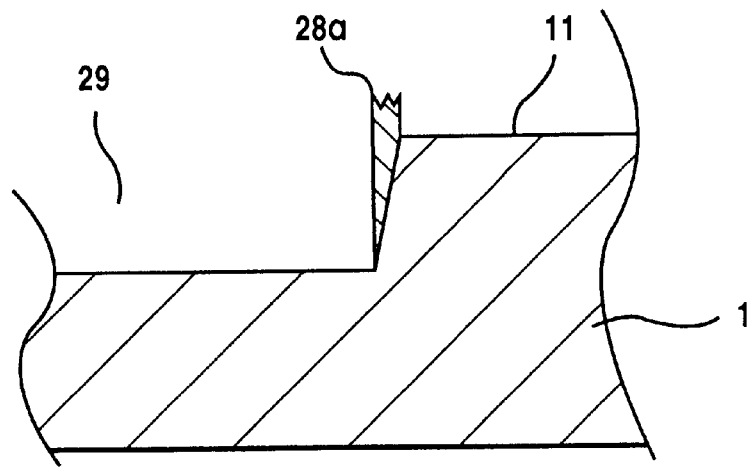
FIG. 23B is a conceptual view for illustrating the conventional method of etching to be seen following FIG. 23 A.
Figure 24:
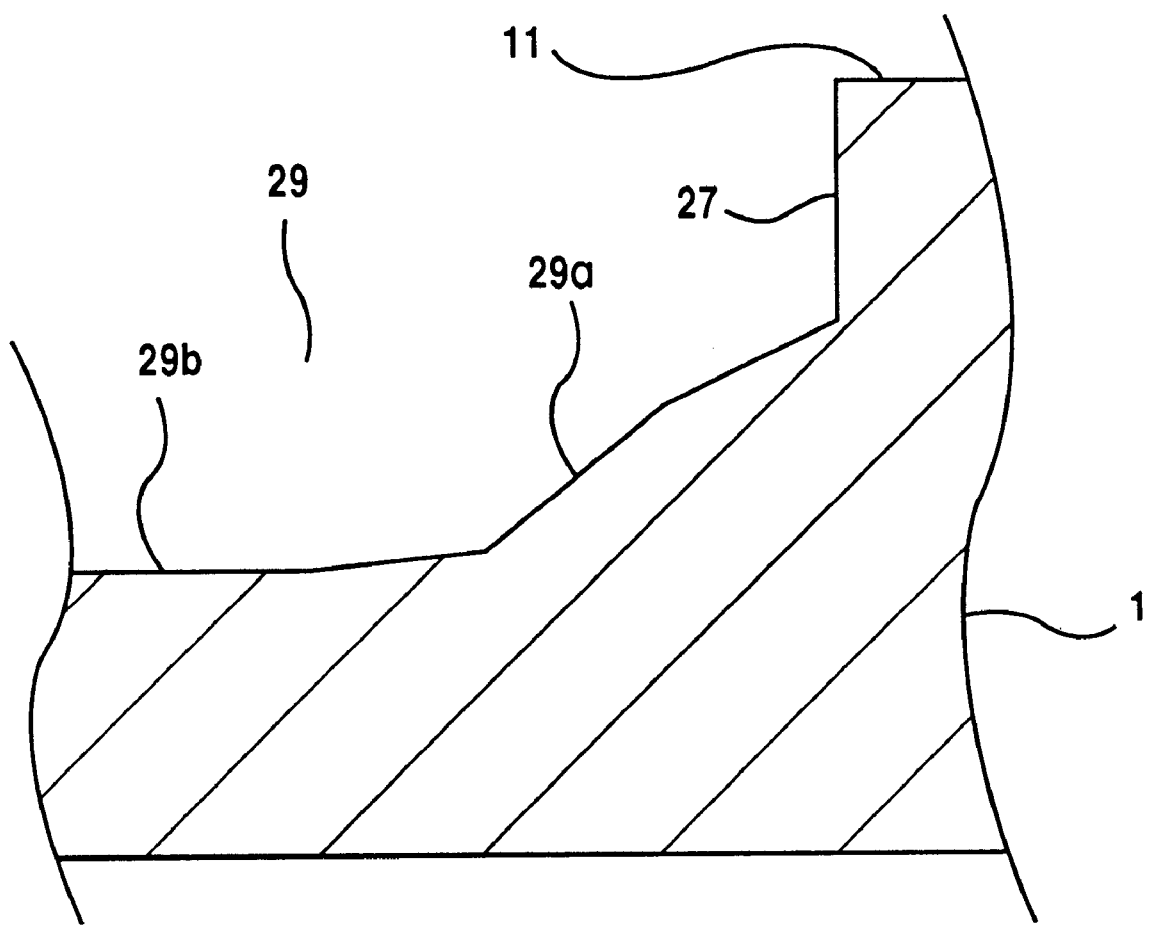
FIG. 24 is a sectional view showing a part of a magnetic head slider after processing by the conventional method.

FIG. 22 shows the relationships between the component pressure ratios of carbon tetrachloride gas and the etching rates as measured in the tenth embodiment.

As is apparent from FIG. 22, it has turned out that there is a tendency of the etching rate increasing according to an increase in the component pressure ratio of carbon tetrachloride until the component pressure ratio reaches 60%. The maximum etching rate (640 nm/min) was reached at 60% of the component pressure ratio of carbon tetrachloride, equivalent to an etching rate, enabling etching to a depth of 5 $\mu$m or more in eight minutes. It has been observed, however, that at the component pressure ratio of carbon tetrachloride exceeding 60%, there was a tendency of the etching rate starting to decrease and at the component pressure ratio exceeding 80%, a substance which appears to be a brown polymer started building up on a work surface of the magnetic head slider substrate 1, deteriorating roughness of the work surface considerably.

This has shown that the component pressure ratio of carbon tetrachloride should be preferably kept at 80% or less against the aggregate pressure of the gas mixture brought in and when same is at around 60%, pronounced beneficial effects are observed.

When the component pressure ratio of carbon tetrachloride gas was at 80% or less, no burr was observed on the work surface of the magnetic head slider substrate 1 after the mask removal process.

An eleventh embodiment of the present invention was carried out using the inductively coupled plasma etching apparatus as used in the first embodiment (see FIG. 3), adopting the same process, materials, and operating condition as used in the first embodiment. In this embodiment, a base mixture of chlorine gas and boron trichloride gas was introduced into an excitation chamber 14 as reactive gas from a gas inlet port 17, and plasma excitation of the gas mixture was caused to occur.

Hereupon, chlorine ions involved in reactive etching were generated by the gas mixture of chlorine gas and boron trichloride gas, and drawn to a work surface of the magnetic head slider substrate 1 by a radio frequency power applied to an electrode 13.

In the eleventh embodiment of the invention, measurement was made to establish relationships between component pressure ratios of boron trichloride gas against the aggregate pressure of the gas mixture introduced into the excitation chamber 14 and etching rates by varying said component pressure ratio from 0 to 100%.

Figure 21:
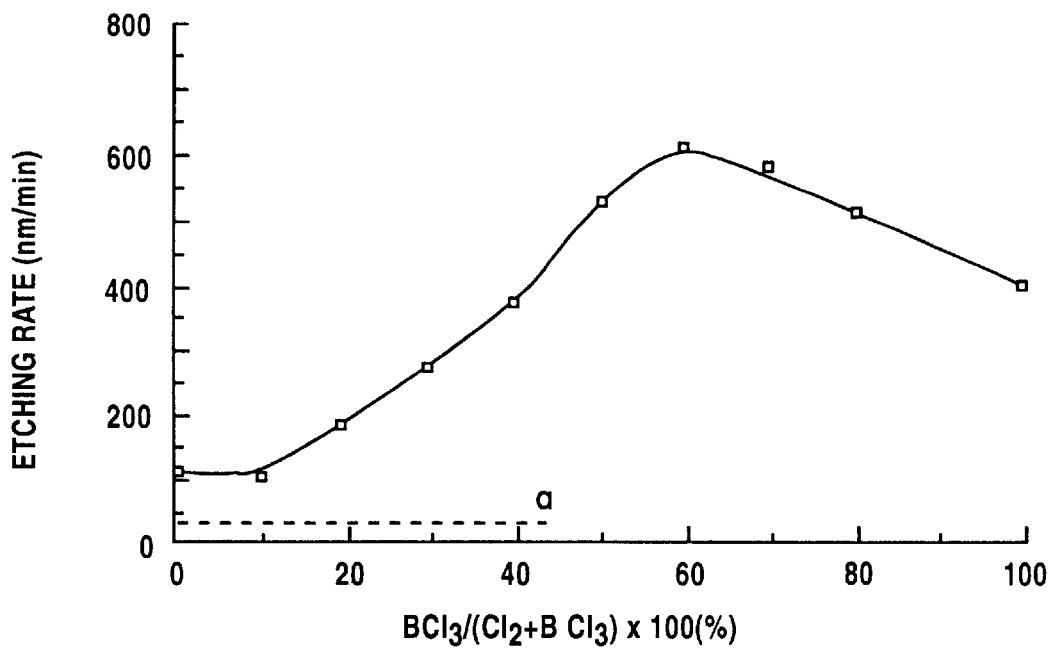
FIG. 21 is a graph showing the measurement results of etching rates, carried out on the basis of an eleventh embodiment of the invention.

FIG. 21 shows the relationships between the component pressure ratios of boron trichloride gas and the etching rates as measured in the eleventh embodiment.

FIG. 21, makes it apparent that there was a tendency of the etching rate increasing according to an increase in the component pressure ratio of boron trichloride gas until the component pressure ratio reaches 60%. The maximum etching rate (600 nm/min) was attained at 60% of the component pressure ratio of boron trichloride gas, equivalent to an etching rate enabling etching to a depth of slightly less than 5 μm in eight minutes.

It has been observed, however, that at the component pressure ratio of boron trichloride exceeding 60%, there was a tendency of the etching rate starting to decrease gradually. Nevertheless, an etching rate as high as 400 nm/min was indicated at 100% of the component pressure ratio of boron trichloride gas, that is, even when only boron trichloride gas as reactive gas was introduced into the excitation chamber 14.

Further, no burr was observed on the work surface of the magnetic head slider substrate 1 after the mask removal process.

COMPARATIVE EXAMPLE 3

The etching process according to the conventional sputter-etching method by use of argon gas was applied to the magnetic head slider substrate, by way of an example for proving the effect of the second method of the invention.

Tests were carried out by adopting the same apparatus, materials, process, and operating conditions as used in the ninth embodiment through the eleventh embodiment, except for gases used, and the sputter-etching process was applied by introducing argon gas into the excitation chamber.

Test results show that an etching rate in this comparative example was 30 nm/min, equivalent to less than one twentieth of the maximum etching rate achieved in the tenth embodiment and the eleventh embodiment of the invention. Furthermore, redeposition layers having the same chemical composition as that of the magnetic head slider substrate were observed built up on a work surface of the magnetic head slider substrate and left intact even after the resist removal process and a cleaning process, eventually remaining as burrs. The reason for such results as above is presumably that nothing but sputter-etching by argon ion bombardment can take place in this case even if plasma excitation of argon gas is caused to occur because argon gas is an inert gas. This has proven the effectiveness of using a gas selected from the group consisting of chlorine gas, a mixture of chlorine gas and carbon tetrachloride gas, boron trichloride gas, and a mixture of chloride gas and boron trichloride gas.

Broken lines denoted by a as shown in FIGS. 21 and 22, respectively, represent the etching rates as measured in the comparative example 3.

In both the second embodiment and the eleventh embodiment of the invention described in the foregoing, the inductively coupled plasma etching apparatus of the construction as shown in FIG. 3 is in use. According to the results of the etching process applied in the second embodiment (see FIG. 4) wherein a gas mixture consisting of boron trichloride gas at 60% and chlorine gas at 40% was introduced in the excitation chamber 14 together with argon gas, an etching rate at the component pressure ratio of argon gas at 0% indicates 200 nm/min. An atmosphere where the component pressure ratio of argon gas is 0% represents nothing but a case in which only the gas mixture consisting of 60% boron trichloride gas and 40% chlorine gas was introduced into the excitation chamber 14 to perform the etching process.

Meanwhile, according to the results (FIG. 21) of the etching process applied in the eleventh embodiment wherein a gas mixture consisting of boron trichloride gas and chlorine gas was introduced into the excitation chamber 14, the etching rate at the component pressure ratio of boron trichloride gas at 60% (that is, a ratio of boron trichloride gas to chloride gas at 60/40) indicates 600 nm/min.

It is presumed that such a significant difference in measurement results as above between the aforesaid embodiments carried out using the same gas is due to changes made in the dimensions of the plasma etching apparatus employed. Specifically, the diameter of the antenna 15 as well as same of the main body 12 were changed between times when the respective embodiments were carried out, resulting in a difference in, for example, a volume of the excitation chamber 14 and a distance between the magnetic head slider substrate 1 disposed on the electrode 13 and the antenna 15, presumably causing a change to the plasma excitation state.

Needless to say, the etching apparatus of the same size was used for both the respective embodiments of the invention and corresponding comparative examples according to the conventional sputter-etching method.

The method of fabricating the magnetic head slider according to the invention may be practiced by use of various types of etching apparatuses constructed such that while plasma excitation of a gas introduced therein is caused to occur by an appropriate means, ions in the plasma are able to be drawn to a magnetic head slider substrate (workpiece) by applying a bias voltage. For example, the eighth embodiment through the eleventh embodiment may be practiced, respectively, by use of any of the etching apparatuses as shown in FIGS. 7, 10, 13, and 16.

Naturally, it is possible to adjust as necessary frequencies of high frequency waves and microwaves that are utilized for plasma excitation and biasing without being limited to the values as set in the embodiments described in the foregoing.

Also a workpiece made of various types of ceramic materials containing alumina and titanium carbide as main constituents may be used for forming the magnetic head slider substrate. The geometry of the air bearing grooves formed on the magnetic head slider substrate may be designed optionally. Further, the method according to the invention is applicable to the fabrication of the slider for a contact type head such as a vertical magnetic head or a quasi-contact type magnetic head.

What is claimed is:

1. A method of fabricating a magnetic head slider comprising the steps of:

forming a mask having a predetermined pattern on a work surface of a magnetic head slider substrate, said substrate being made of mainly aluminum oxide and titanium carbide, setting the magnetic head slider substrate with said mask formed thereon on top of an electrode disposed inside an etching apparatus, introducing a reactive gas and an inert gas into an excitation chamber of said etching apparatus to cause plasma excitation of said gases to occur, and drawing reactive gas ions and inert gas ions generated through said plasma excitation to the magnetic head slider substrate by applying a radio frequency power to said electrode, reactive etching by said reactive gas ions and sputter-etching by said inert gas ions being caused to proceed concurrently, wherein said reactive gas is selected from the group consisting of chlorine gas, carbon tetrachloride gas, boron trichloride gas, a gas mixture of chlorine gas and boron trichloride gas, bromine gas, hydrogen bromide gas, and boron tribromide gas.

2. A method of fabricating a magnetic head slider comprising steps of:

forming a mask having a predetermined pattern on a work surface of a magnetic head slider substrate; said substrate being made of mainly aluminum oxide and titanium carbide, setting the magnetic head slider substrate with said mask formed thereon on top of an electrode disposed inside an etching apparatus, introducing a reactive gas into an excitation chamber of said etching apparatus to cause plasma excitation of said reactive gas to occur, drawing reactive gas ions generated through said plasma excitation to the magnetic head slider substrate by applying a radio frequency power to the electrode, and causing sputter-etching through reactive etching by said reactive gas ions to proceed, wherein a gas selected from the group consisting of chlorine gas, a gas mixture of chlorine gas and carbon tetrachloride gas, a gas mixture of chlorine gas and boron trichloride gas, boron trichloride gas, bromine gas, hydrogen bromide gas, and boron tribromide gas is used as said reactive gas.

3. A method of fabricating a magnetic head slider according to claim 2, wherein a ratio of component pressure of carbon tetrachloride gas to an aggregate pressure of the gas mixture of chlorine gas and carbon tetrachloride gas, introduced into the excitation chamber as the reactive gas, is kept at 80% or less.

* * * * *